United States Patent [19]
Yoshimi et al.

[11] Patent Number: 5,609,968
[45] Date of Patent: *Mar. 11, 1997

[54] WELDABLE COLORED STEEL SHEET

[75] Inventors: Naoto Yoshimi; Toyofumi Watanabe; Masaaki Yamashita; Toshiyuki Ookuma; Tatsuya Miyoshi, all of Tokyo, Japan

[73] Assignee: NKK Corporation, Tokyo, Japan

[ * ] Notice: The term of this patent shall not extend beyond the expiration date of Pat. No. 5,387,473.

[21] Appl. No.: 250,634

[22] Filed: May 27, 1994

Related U.S. Application Data

[63] Continuation of Ser. No. 795,681, Nov. 21, 1991, abandoned.

[30] Foreign Application Priority Data

Nov. 30, 1990 [JP] Japan ................................. 2-338978

[51] Int. Cl.$^6$ ................................................. B32B 15/08
[52] U.S. Cl. .......................... 428/623; 428/626; 428/457
[58] Field of Search ................................. 428/621, 626, 428/635, 658, 663, 623, 659; 8/685

[56] References Cited

U.S. PATENT DOCUMENTS

| | | | |
|---|---|---|---|
| 3,928,292 | 12/1975 | Maeda et al. | 260/77.5 |
| 4,423,132 | 12/1983 | Kondo et al. | 430/67 |
| 4,555,445 | 11/1985 | Frey et al. | 428/340 |
| 4,643,769 | 2/1987 | Othen | 106/1.17 |
| 4,876,160 | 10/1989 | Shindou et al. | 428/623 |
| 4,948,678 | 8/1990 | Shindou et al. | 428/623 |
| 4,981,759 | 1/1991 | Nakatani et al. | 428/626 |
| 5,049,608 | 9/1991 | Medina | 524/375 |
| 5,059,492 | 10/1991 | Shindou et al. | 428/625 |
| 5,106,675 | 4/1992 | Ara et al. | 428/219 |
| 5,244,587 | 9/1993 | Ito et al. | 252/25 |
| 5,376,454 | 12/1994 | Sugasawa et al. | 428/421 |
| 5,378,291 | 1/1995 | Ara et al. | 148/251 |

FOREIGN PATENT DOCUMENTS

| | | |
|---|---|---|
| 0380024 | 8/1990 | European Pat. Off. . |
| 0385362 | 9/1990 | European Pat. Off. . |
| 30593 | 12/1980 | Japan . |
| 193376 | 11/1983 | Japan . |
| 38276 | 8/1986 | Japan . |
| 10292 | 1/1987 | Japan . |
| 30262 | 7/1987 | Japan . |
| 2194249 | 3/1988 | United Kingdom . |

OTHER PUBLICATIONS

Bigelow et al., "The Chemistry of Synthetic Dyes and Pigments", 1972, pp. 577–578.
Database JAPS/JPO Host: Epooue (E.P.O.) & JP–A–62010292 (Nippon Steel Corp.) Jan. 19 1987.

*Primary Examiner*—David A. Simmons
*Assistant Examiner*—Linda L. Gray
*Attorney, Agent, or Firm*—Nields & Lemack

[57] ABSTRACT

A colored steel sheet having a coating thickness which is sufficiently small to permit welding therethrough, and yet exhibiting an excellently colored and lustrous surface. It is a steel sheet having a surface plated with zinc or a zinc alloy, and carrying a chromate film formed on its plated surface, and a colored film formed on the chromate film from a composition comprising specific proportions of a thermosetting resin and a dye, which are both soluble in an organic solvent. The composition may further contain a solid lubricant, or a granular rust-inhibitive pigment, or both. The colored film has a specific range of thickness, and a color other than black.

11 Claims, 2 Drawing Sheets

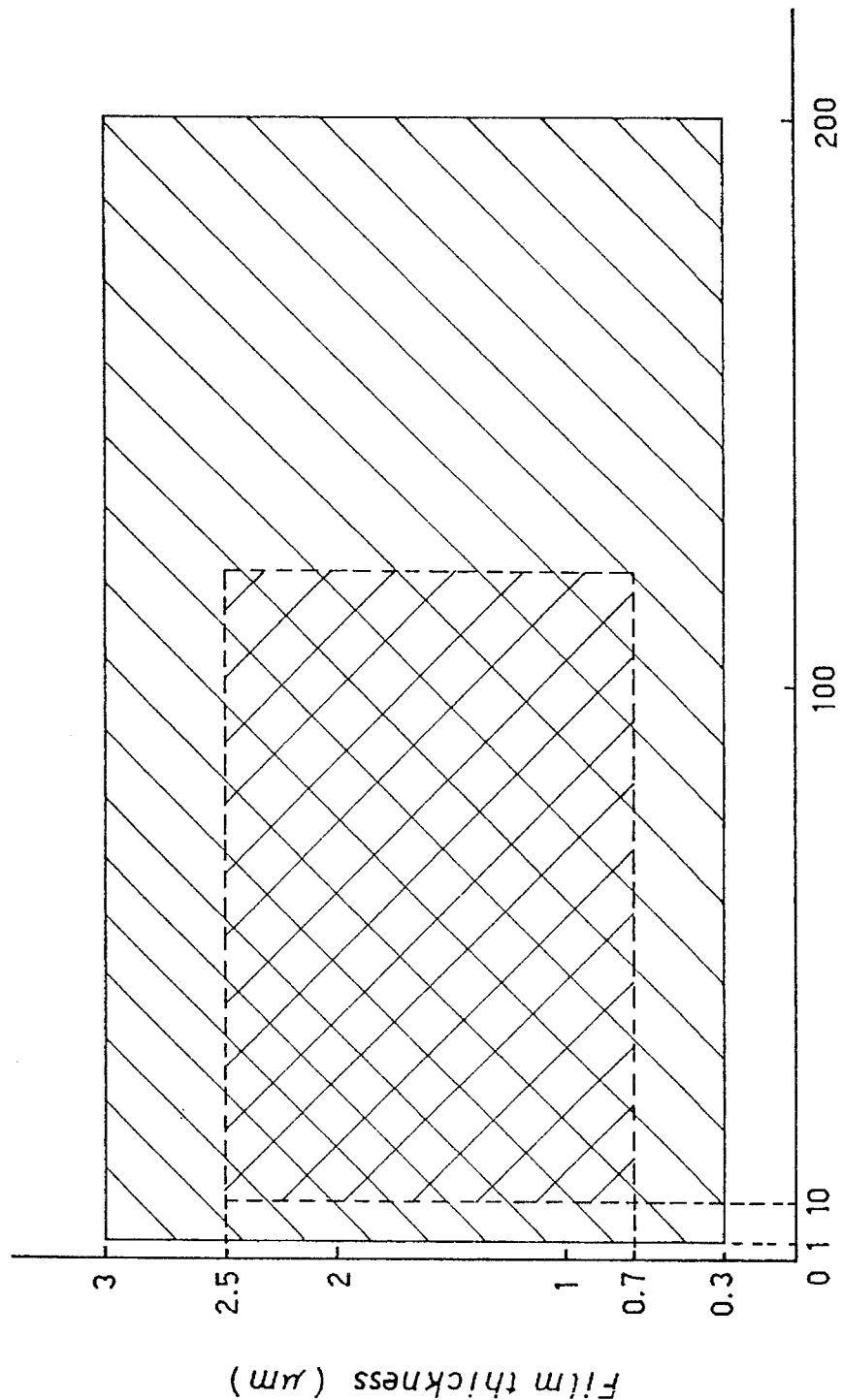

WELDABLE COLORED STEEL SHEET

This application is a continuation of application Ser. No. 07/795,681 filed Nov. 21, 1991, now abandoned.

FIELD OF THE INVENTION

This invention relates to a weldable and colored steel sheet having an excellent appearance which is suitable for use in making electric appliances for domestic use, machines or furniture for office use, copying machines, etc.

BACKGROUND OF THE INVENTION

The manufacture of a variety of products having high quality, particularly in the fields of electric appliances for domestic use, and machines or furniture for office use, has created a growing demand for weldable and colored steel sheets having an excellent appearance which are made by the continuous and rapid treatment of steel sheets plated with zinc or an alloy thereof. The demand extends to sheets having a variety of colors.

There are known a number of methods which enable the manufacture of weldable black steel sheets in a continuous strip line. It has, however, been difficult to make a weldable steel sheet having any color other than black, since it has been difficult to produce a uniform color in a wide surface area.

The following is a brief description of the known methods for forming a colored film on a steel sheet, or a steel sheet plated with zinc:

(a) A resin solution containing an organic or inorganic pigment is applied onto a steel sheet by e.g. spraying or roll coating to form thereon a film having a thickness of several tens of microns.

(b) A plating layer existing on a steel sheet is caused to undergo reaction or electrolysis to develop a colored film. This method includes variations as will hereunder be set forth:

(b-1) A steel sheet is dipped in a chromating solution containing chromic acid and another acid, and if the bath composition and the reaction temperature are appropriately varied, it is possible to form a lustrous rainbow-colored film, an unlustrous yellowish green film, or a differently colored film on a steel surface plated with pure zinc;

(b-2) A chromating solution containing $Ag^+$ ions is used to form a black chromate film on a steel surface plated with pure zinc (as described in Japanese Patent Application Laid-Open No. 193376/1983);

(b-3) A chromate film is formed on a steel surface plated with pure zinc, and the steel surface is, then, dyed by dipping in a dye solution;

(b-4) A steel surface plated with pure zinc is dipped in a solution containing $Ni^{2+}$ or $Cu^{2+}$ ions, so that the metal which the solution contains may be deposited on the steel surface to form a colored film thereon;

(b-5) A plating layer of pure zinc is subjected to anodic oxidation in an alkali solution to form a black film;

(b-6) An electroplating layer of a Zn—Co, Zn—Ni or Zn—Mo alloy is subjected to anodic treatment to form a black film (Japanese Patent Publication No. 38276/1986); and (b-7) A steel sheet which has been plated with a Zn—Ni alloy is subjected to dipping, spraying, or anodic treatment with a solution containing nitric acid or a nitrate group to develop a black surface (Japanese Patent Publication No. 30262/1987).

(c) The surface of a steel sheet, or a steel sheet plated with zinc is subjected to cathode electrolysis treatment to form a colored film (e.g. Japanese Patent Application Laid-Open No. 10292/1987).

(d) A solution obtained by adding an organic dye to an aqueous solution of potassium sodium silicate is applied onto a steel surface plated with zinc or an alloy thereof to improve corrosion resistance and adhesion (Japanese Patent Publication No. 30593/1980).

All of these methods do, however, have their own drawbacks, as will hereunder be pointed out.

(a) This is a common method of coating which employs an organic or inorganic pigment as a coloring agent. The uniform distribution of the pigment in a film is, however, essential to ensure a uniform color tone, and calls for a film thickness of at least about 10 microns. This thickness is too large to permit spot welding. The maximum film thickness that permits welding has been about three microns, and has been too small to ensure the uniform distribution of the pigment.

(b) All of the methods as described at (b-2), and (b-5) to (b-7) are useful for forming only a black film.

(b-1) This method is likely to form an unevenly colored surface, since its color is greatly affected by even a small difference in thickness of a chromate film. Moreover, it can form only a film having a yellowish or greenish color which is specific to a reactive chromate.

(b-2) This method is useful for forming only a black film, as hereinabove stated. Moreover, the solution containing $Ag^+$ ions is very expensive.

(b-3) The dyeing of the chromate film requires a period of several or more minutes. This period is too long for the continuous coloring treatment of a steel strip, for which only a period not exceeding five seconds is permissible.

(b-4) This method requires a treating time of as long as several or more minutes, but can form only a film of poor adhesion. Moreover, a film formed by the deposition of $Cu^{2+}$ ions has the drawback of changing in color as a result of oxidation with the passage of time.

(b-5) This method is also unsuitable for the continuous treatment of a strip, since it requires a treating time which is as long as 5 to 20 minutes.

(b-6) and (b-7) These methods are both useful for forming only a black film, as hereinabove stated, though they can be carried out rapidly. Moreover, the dissolution of metal ions from a plating layer is not only uneconomical, but also obstructs continuous operation seriously, as the dissolved metal ions deteriorate the solution for the blackening treatment. Furthermore, both of the methods have only a limited scope of application, i.e. (b-6) is applicable only to a steel sheet plated with a Zn—Co, Zn—Ni or Zn—Mo alloy, while (b-7) is applicable only to a sheet plated with a Zn—Ni alloy.

(c) This method is mainly employed for forming a black film and can only form a film of poor adhesion.

(d) This method is not intended for forming a film having an excellent appearance, nor is it intended for imparting weldability, insofar as the disclosure does not contain any specific reference to the film thickness. Moreover, as the film is basically composed of potassium sodium silicate, the hardened film is unsatisfactory in lubricating property as required during the press forming of the steel sheet, and is, therefore, unsuitable for any steel sheet used for making electric appliances for domestic use, office machines or furniture, etc. Moreover, the disclosure does not specifically define the organic dye to be used. There are a very large number of kinds of organic dyes which are widely different from one another in properties including light fastness, tinting strength and solubility in a solvent. Some dyes are superior to others in e.g. tinting strength, but inferior in light fastness. It is, therefore, needless to say that all of the organic dyes are not equally useful.

SUMMARY OF THE INVENTION

Under these circumstances, it is an object of this invention to provide a weldable colored steel sheet coated with a film which is sufficiently small in thickness for permitting spot welding, and yet presents an excellently colored and highly lustrous surface. The steel sheet of this invention is an improvement over the product of the known method as described at (a) above, and can therefore overcome all of the drawbacks of the known methods relying upon reaction or electrolysis as described at (b) above. The steel sheet of this invention has a uniformly colored surface having any of a wide variety of colors as desired.

It is another object of this invention to provide a colored steel sheet which is not only weldable and excellent in appearance, but also excellent in corrosion resistance, film adhesion and formability.

We, the inventors of this invention, have done an extensive range of research and experimetal work to attain the above objects, and particularly, to obtain a uniformly and beautifully colored film having a thickness which is sufficiently small to permit the welding of the underlying steel sheet. As a result, we have found that the above objects can be attained if a colored film having an appropriate thickness is formed from a composition obtained by mixing a base resin and a specific dye in a specific ratio, and that it is possible to produce a weldable colored steel sheet having still higher levels of corrosion resistance, film adhesion and formability if a film having a specific multilayer structure including the above colored film is formed on the steel sheet, or if the composition further contains a specific component as required. Our discovery of these facts forms a basis for this invention.

This invention, therefore, resides essentially in a steel sheet having a surface plated with zinc or a zinc alloy, and carrying a chromate film formed on the plated surface, and a colored film formed in an appropriate thickness on the chromate film from a composition comprising specific proportions of a thermosetting resin and a dye which are soluble in an organic solvent, and further containing a specific additive or additives, if required.

The following is a more specific summary of this invention:

(1) A weldable colored steel sheet having a surface plated with zinc or a zinc alloy, and carrying a chromate film formed on the plated surface and having a coating weight of 1 to 200 mg/m$^2$ in terms of metallic chromium, and a colored film formed on the chromate film from a composition comprising 100 parts by weight of a thermosetting resin as a base resin and 1 to 200 parts by weight of a dye as a coloring agent, the resin and the dye being both soluble in an organic solvent, the colored film having a thickness of 0.3 to 3.0 microns, and a color other than black.

(2) A weldable colored steel sheet having a surface plated with zinc or a zinc alloy, and carrying a chromate film formed on the plated surface and having a coating weight of 1 to 200 mg/m$^2$ in terms of metallic chromium, and a colored film formed on the chromate film from a composition comprising 100 parts by weight of a thermosetting resin as a base resin, 1 to 200 parts by weight of a dye as a coloring agent and 1 to 100 parts by weight of a solid lubricant, the resin and the dye being both soluble in an organic solvent, the colored film having a thickness of 0.3 to 3.0 microns, and a color other than black.

(3) A weldable colored steel sheet having a surface plated with zinc or a zinc alloy, and carrying a chromate film formed on the plated surface and having a coating weight of 1 to 200 mg/m$^2$ in terms of metallic chromium, and a colored film formed on the chromate film from a composition comprising 100 parts by weight of a thermosetting resin as a base resin, 1 to 200 parts by weight of a dye as a coloring agent and 1 to 100 parts by weight of a granular rust-inhibitive pigment, the resin and the dye being both soluble in an organic solvent, the colored film having a thickness of 0.3 to 3.0 microns, and a color other than black.

(4) A weldable colored steel sheet having a surface plated with zinc or a zinc alloy, and carrying a chromate film formed on the plated surface and having a coating weight of 1 to 200 mg/m$^2$ in terms of metallic chromium, and a colored film formed on the chromate film from a composition comprising 100 parts by weight of a thermosetting resin as a base resin, 1 to 200 parts by weight of a dye as a coloring agent, 1 to 100 parts by weight of a solid lubricant and 1 to 100 parts by weight of a granular rust-inhibitive pigment, the resin and the dye being both soluble in an organic solvent, the colored film having a thickness of 0.3 to 3.0 microns, and a color other than black.

The dye may be an azo, azomethine, quinoline, ketoneimine, fluorone, nitro, xanthene, acenaphthene, quinophthalone, anthraquinone, aminoketone, methine, perylene, coumarin, perinone, triphenyl, triallylmethane, phthalocyanine, isochlorophenol, or azine dye, or a mixture of two or more such dyes.

The use of an azo dye composed of a complex metal salt is particularly effective for forming a colored film which is excellent in all of appearance, light fastness and corrosion resistance.

If a solid lubricant is added, it is preferable to use one or more materials selected from the group consisting of hydrocarbon compounds such as polyolefin wax, fluororesins, fatty acid amides, metallic soaps, metal sulfides such as molybdenum disulfide, graphite, graphite fluoride, boron nitride and polyalkylene glycols. If a granular rust-inhibitive pigment is added, it is preferable to use one or more materials selected from the group consisting of sparingly soluble chromium compounds and silica.

BRIEF DESCRIPTION OF THE DRAWINGS

FIG. 2 is a graphical representation of the ranges defined by this invention for the proportion of a dye used to form a colored film, and for the thickness of the film.

DETAILED DESCRIPTION OF THE INVENTION

This invention is directed to a colored steel sheet other than a black steel sheet carrying a black film (i.e. a film containing as a coloring agent substantially only a blackening agent such as a black dye or pigment). Therefore, the term "colored steel sheet, or film" as herein used does not include any black steel sheet, or film. The colored steel sheet of this invention is defined as one carrying a colored film having a chromatic or achromatic color having a luminosity, or L value in excess of 25, so that it may be distinguished from a black steel sheet. It is, however, to be understood that this invention includes also any steel sheet carrying a colored film formed by employing a black dye with a dye having another color, as will hereinafter be described in further detail. It is also to be understood that the scope of this invention does not exclude any colored steel sheet having an achromatic color other than black, though the colored steel sheet of this invention may, in the majority of the cases, have a chromatic color.

Figure 1:
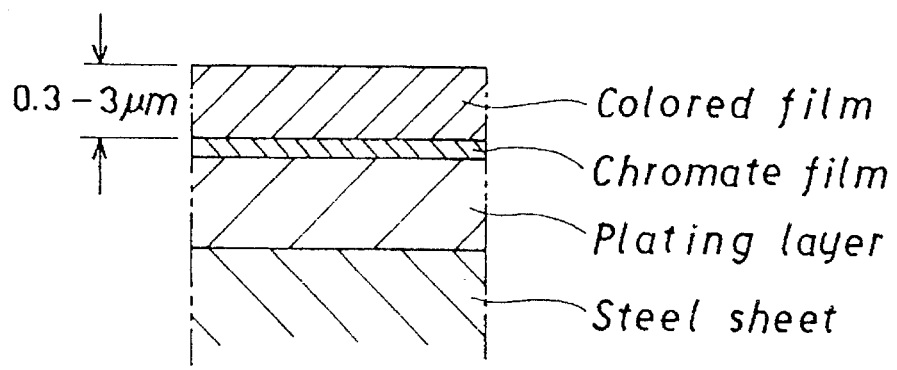
FIG. 1 is a schematic representation of the film structure of a steel sheet embodying this invention.

The colored steel sheet of this invention essentially comprises a steel sheet plated with zinc or a zinc alloy, which is a starting material, a chromate film formed on its plated surface, and a colored film formed on the chromate film from a composition comprising a thermosetting base resin which is soluble in an organic solvent, and a dye which is also soluble in an organic solvent. Its cross sectional construction is schematically shown in FIG. 1.

The steel sheet used as a starting material is, for example, a steel sheet plated with zinc, an alloy of zinc and iron, an alloy of zinc and nickel, an alloy of zinc and manganese, an alloy of zinc and aluminum, an alloy of zinc, cobalt and chromium, or a similar plating composition further containing one or more elements such as Ni, Fe, Mn, Mo, Co, Al and Cr. It is also possible to use as a starting material a steel sheet coated with a disperse plated layer formed from a composition similar to any of those mentioned above, but further containing, for example, a granular resin, silica, or a chromium compound. Moreover, the starting material may be a compositely plated steel sheet carrying a plating film formed by two or more layers of the same or different compositions, for example, a film formed by two or more layers consisting of Zn—Fe alloys having different iron contents, respectively.

As far as its appearance is concerned, a similar colored film can be produced on any steel sheet and a cold rolled steel sheet which has not been plated can, for example, be used as a starting material. From the standpoint of corrosion resistance, however, it is necessary to use a plated steel sheet as a starting material, insofar as the colored steel sheet of this invention is used for making a final product to which no further painting will be given.

Any practically possible method, such as an electrolytic, dip coating, or vapor phase process, can be employed for preparing the starting material.

A chromate film is formed on the surface of the starting material by chromate treatment. The combination of the chromate film and a colored film containing a specific coloring agent, or dye, as will hereinafter be described, gives a very high level of corrosion resistance to the colored steel sheet of this invention.

The chromate film is so formed as to have a dry coating weight of 1 to 200 mg/m$^2$, preferably 10 to 80 mg/m$^2$, in terms of metallic chromium. If its coating weight exceeds 200 mg/m$^2$, it is likely to lower the formability and weldability of the steel sheet. If its coating weight is smaller than 1 mg/m$^2$, it is likely to lack uniformity and lower the corrosion resistance of the steel sheet. The chromate film preferably contains chromium having a valence of 6, since chromium ions having a valence of 6 have a repairing action and prevent corrosion occurring from any surface defect on the steel sheet.

The chromate treatment for forming the chromate film can be carried out by any known process relying upon reaction, coating or electrolysis.

If the colored film is of a color having a high L value, such as yellow, red or blue, the chromate film is preferably of a nearly white color, so that the color of the colored film may not be dulled by the color of the underlying chromate film.

If a coating type of process is employed for the chromate treatment, it is carried out by employing a coating solution which consists mainly of a partially reduced chromic acid solution and may further contain a water-dispersible or-soluble organic resin, such as an acrylic resin, and/or silica (colloidal or fumed) having a particle diameter of several to several hundred millimicrons. The solution may contain chromium ions having a valence of 3 and ones having a valence of 6 in a ratio of 1:1 to 1:3, and have a pH of 1.5 to 4.0, preferably 2 to 3. The ratio of the chromium ions having a valence of 3 to those having a valence of 6 is adjusted by employing a commonly used organic reducing agent selected from among, for example, saccharides and alcohols, or a commonly used inorganic reducing agent. The coating type of chromate treatment may be carried out by any commonly used method, such as roll coating, dipping, or spraying. The treatment is not followed by water rinsing, but is directly followed by drying to give a chromate film, since rinsing results in the removal of chromium ions having a valence of 6. The film contains chromium ions having valences of 3 and 6 in the ratio in which the solution contains them. A resin film, which will be formed on the chromate film, prevents any excessive flow of chromium ions having a valence of 6 out of the chromate film in a corrosive environment and enables the maintenance of effective passivation and thereby high corrosion resistance for a long period of time.

An electrolytic type of chromate treatment is carried out by cathodic treatment in a bath comprising chromic anhydride and one or more kinds of anions selected from among, for example, sulfuric acid, phosphoric fluoride and halogenoxy acids, and is followed by rinsing in water and drying to give a chromate film.

The chromate film which is formed by the coating type of process contains a larger amount of chromium having a valence of 6 than that formed by the electrolytic process, and is, therefore, superior in corrosion resistance. The corrosion resistance of the former film becomes still better upon heat treatment, which improves its density and strength, as will hereinafter be described in further detail. The chromate film which is formed by the electrolytic process has the advantages of being high in density and strength even without being given heat treatment, and of being easy to control in coating weight.

Description will now be made of the colored film formed on the chromate film and its components. According to this invention, the colored film is principally characterized by comprising a thermosetting resin which is soluble in an organic solvent, as a base resin, and a dye which is also soluble in an organic solvent, as a coloring agent. The film may further contain a solid lubricant which is added to improve its formability or a rust-inhibitive pigment added to improve its corrosion resistance, or both.

It is essential that the coloring agent which is employed to form the colored film be capable of giving a uniformly and beautifully colored surface when the film has a thickness allowing the welding of the underlying steel sheet, i.e. not exceeding three microns. Moreover, it is imperative for the coloring agent not to exert any adverse effect on any other property required of the colored film, such as formability or corrosion resistance, when it is mixed with the base resin in a ratio ensuring that the film exhibit a good appearance.

There are two major classes of coloring agents: pigments (inorganic and organic), and dyes. The pigments are generally particulate, and are dispersed in a solvent when they are used. They are widely used for coating the surfaces of automobile bodies, and electric appliances for domestic use. Prussian blue and chrome yellow are examples of inorganic pigments and quinacridon and phthalocyanine pigments are examples of organic pigments. The pigments are usually employed to form a coating having a thickness of 10 or more microns which does not permit any welding therethrough.

If a pigment is used in a film having a thickness not exceeding three microns to form a weldable steel sheet, the particles of the pigment contact one another and agglomerate, and the film, therefore, fails to show a satisfactorily high hiding power. The film is not lustrous, either. The addition of a large amount of pigment to a resin film lowers its formability and adhesive strength. Moreover, the invasion of water through the interstices of the pigment particles is likely to lower the corrosion resistance of the base material. As is obvious from the foregoing, the use of a pigment as a coloring agent cannot form a satisfactorily thin colored film having a good appearance, and the use of a large amount of pigment results in a film having lower properties. Thus, it has been impossible to form a colored film having a thickness which is sufficiently small to permit welding, and having a good appearance.

No combination of two or more inorganic or organic pigments has been found capable of producing any satisfactory result.

Referring now to the dyes, it is understood that thousands of dyes are commercially available when counted by tradenames. They are classified by two major methods, i.e. (I) one classifying the dyes by the chemical structure thereof, and (II) one for the practical classification of the dyes based on their properties (see e.g. "Handbook of Organic Chemistry", complied by The Society of Organic Synthetic Chemistry, and published by Gihodo).

The method as stated at (I) above classifies the dyes by the chemical group in the molecule which gives rise to color. The dyes as classfied by this method include nitroso, nitro, azo (monoazo, disazo, trisazo, tetrakisazo), anthraquinone, indigo, azine, cyanine, phthalocyanine, stilbene, sulfur, triazole, triphenylmethane, acridine, diphenylmethane, and oxazine dyes.

The dyes as classified by the method (II) include direct, acid, basic, acid mordant, premetallized, sulfur, vat, azoic, disperse, reactive, oxidation, fluorescent brightener, and oil-soluble (organic solvent-soluble) dyes.

It follows from these two ways of classification that, for example, the acid dyes according to the classification by the method (II) include azo (monozo, disazo, trisazo and tetrakisazo), anthraquinone, triphenylmethane, and azine dyes according to the classification by the method (I).

The color of a dye as the most important property thereof is due to the action of a chemical group containing an unsaturated bond, such as —CH═CH—, or —N═N— (chromophore), and a group containing a lone pair of electrons, such as —NH$_2$ or —OH (auxochrome), whereby, while light having a particular wavelength is absorbed, light having a different wavelength not causing absorption is visible to the eye as the color of the dye. Thus, there are various dyes having a variety of colors. These colors are yellow, orange, red, violet, blue, green, brown and black according to the classification by the Color Index.

The Color Index (Third Edition, Vols. 1 to 8) published by The Society of Dyers and Colourists and American Association of Textile Chemists and Colourists describes the commercially available dyes by class, structure, properties, use, etc., and classifies the dyes under "C.I. Generic Name".

The Color Index classifies the commercially available dyes in a practically useful way similar to that of classification by the method as stated at (II) above, and gives the classification of the colors which includes the classification of the dyes by the chemical structure in a numerical order starting with 1. If the chemical structural formula of a dye is specifically known, it is shown under "C.I. Constitution Number", and the majority of the dyes of which the chemical structural formulas are not clear are classified by chemical structure as, for example, azo (monoazo, disazo, etc.), anthraquinone, and azine dyes, as is the case with the classification by the method stated at (I) above.

For example, the yellow dyes belonging to the class of acid dyes are grouped under the classification "C.I. Acid Yellow" which includes "C.I. Acid Yellow 1" covering monoazo dyes having a specific chemical structure, "C.I. Acid Yellow 28" covering disazo dyes having a specific chemical structure, and "C.I. Acid Yellow 109" covering anthraquinone dyes having a specific chemical structure, and classifies the dyes by color, properties, use, etc. The "C.I. Generic Name" provides a listing of dyes by the names under which they are commercially available.

We have examined the dyes belonging to every class of dyes to see whether each dye satisfies the requirements connected with the manufacture and use of the steel sheet according to this invention. The requirements are:

(1) That the dye is soluble or dispersible in a base resin (thermosetting resin) and a solvent (water, or an organic solvent), and does not change in color when a film containing it is baked for thermal setting;

(2) That the dye enables the formation of a uniformly and vividly colored film having a small thickness allowing the welding of the underlying steel sheet, i.e. not exceeding three microns; and (3) That the color of the dye does not fade even in a film which is likely to be exposed to light from various sources, as one formed on a steel sheet used to make electrical appliances for domestic use, office machines or furniture, etc., i.e. the dye has good fastness to light.

It is only the dyes satisfying all of these three requirements that can be used to make the steel sheet of this invention.

We have found that a mixture of a dye which is soluble in an organic solvent, and a thermosetting resin which is soluble in an organic solvent, can form a film having a sufficiently small thickness to allow welding, i.e. not exceeding three microns, and yet exhibiting a uniformly and vividly colored surface.

No other dye is suitable for the purpose of this invention. For example, we have not been able to form any film having a good appearance by using a reactive diazovinylsulfone dye, a mordant monoazo dye, or a disperse azo dye. An insoluble vat dye (C.I. Vat Black) has the drawback of being difficult to dissolve or disperse in any base resin.

For the purpose of this invention, the dye which is soluble in an organic solvent may be any of the dyes belonging to the eight classes "C.I. Solvent Yellow", "C.I. Solvent Orange", "C.I. Solvent Red", "C.I. Solvent Violet", "C.I. Solvent Blue", "C.I. Solvent Green", "C.I. Solvent Brown" and "C.I. Solvent Black" in the Color Index.

This invention does, however, not preclude the use of a dye not registered in the Color Index, such as a new solvent dye not yet registered in the Color Index, or a mixture of solvent dyes. The mixture may be of dyes having the same color, or of ones having different colors. It is well known that the mixing of yellow and red dyes produces an orange color by the subtractive process. This method can be employed to form films having a wide variety of colors.

The solvent dyes which can be employed for the purpose of this invention include azo, azomethine, quinoline, ketoneimine, fluorone, nitro, xanthene, acenaphthene, quinophthalone, anthraquinone, aminoketone, methine, perylene, coumarin, perinone, triphenyl, triallylmethane, phthalocyanine, isochlorophenol, and azine dyes. It is also possible to use a mixture of two or more dyes.

We have found that an azo dye composed of a complex metal salt enables the formation of a colored film which is superior in appearance, light fastness and corrosion resistance to any film formed by employing any other solvent dye.

The azo dye composed of a complex metal salt which is soluble in an organic solvent can be selected from the eight classes in the Color Index which have hereinabove been mentioned. More particularly, it is a complex compound of an azo dye and a trivalent metal, such as chromium, copper or cobalt.

This type of dye is characterized in that (1) it can produce a vivid and uniform color even in a thin film, (2) it is soluble in a solvent, as it does not contain any hydrophilic group in its molecule, and (3) it is superior to any other dye in stability (or fastness) to light, apparently because it is a complex compound having a chemical structure formed by two molecules of an azo dye and one atom of a metal (a complex metal salt of the 2:1 type), or by one dye molecule and one metal atom (a complex metal salt of the 1:1 type). Although Cr, Co, Cu, Fe, Al, etc. can be used to form a complex salt with a dye, chromium is used more often than any other metal.

The Color Index includes the following azo dyes composed of complex metal salts:

(i) C.I. Solvent Yellow: 13, 15, 60, 61, 62, 63, 65, 76, 80, 81, 82, 83, 88, 89, 90, 91, 120, 123, 139, 140, 146 and 161;

(ii) C.I. Solvent Orange: 11, 20, 37, 40, 41, 44, 54, 56 to 59, 62, 70, 81 to 83, 85, 37:1, 94 to 97, and 99;

(iii) C.I. Solvent Red: 8, 81 to 85, 90 to 92, 96, 99, 100, 102, 118, 119, 121 to 123, 127 to 134, 142, 160, 184, 185, 189, 203 to 206, 208, 211, 213, 214, 225 and 226;

(iv) C.I. Solvent Violet: 1, 19, 21, 22, 39 and 46;

(v) C.I. Solvent Blue: 88 and 118;

(vi) C.I. Solvent Green: 21, 27 and 30;

(vii) C.I. Solvent Brown: 23 to 25, 28, 29, 31, 37, 42 to 47, 49, 50, 52 and 58; and (viii) C.I. Solvent Black: 22, 23, 25, 27 to 30, 34 to 38, 40 to 43, 45 and 47 to 49.

It is, of course, possible to use any other azo dye composed of a complex metal salt that is not registered in the Color Index, such as a new product not yet registered, or a mixture of dyes if it contains at least one azo dye composed of a complex metal salt.

If an azo dye composed of a complex metal salt is used as a coloring agent, it is possible to form a colored film having a thickness which is sufficiently small to permit welding (i.e. does not exceed three microns), and yet presenting a uniform and excellent appearance. As this type of dye is very fast to light, it is possible to produce a colored steel sheet which will not present any problem at all when used for electric appliances for domestic use, office machines or furniture, or other devices or articles that may be exposed to light from a variety of sources.

A colored film containing this type of dye has a very high level of corrosion resistance, as hereinabove stated. Its corrosion resistance is by far higher than that of any colored film containing a pigment as a coloring agent. This is apparently due to, among others, the facts that the molecules of the dye are uniformly and densely distributed in the film.

The corrosion resistance of the steel sheet according to this invention owes itself primarily to the barrier effect produced by the chromate forming a passive film by virtue of chromium ions having a valence of 3 and the barrier effect of the resin film, and is further improved by the barrier effect of the dye itself as hereinabove stated. Other factors contributing to its high corrosion resistance include its self-healing action which is achieved by the conversion of chromium ions having a valence of 6 in the chromate to ones having a valence of 3 and rectifying any defect of the passive film, and the high adhesive strength achieved between the zinc or zinc alloy layer and the chromate film, and between the chromate film and the colored film.

Namely the use of an azo dye composed of a complex metal salt enables a very high level of corrosion resistance, presumably by virtue of the synergistic effect produced by the azo dye composed of a complex metal salt and the underlying chromate, as will be obvious from EXAMPLE 6.

A solvent dye is easily soluble in an organic solvent, such as alcohol, Cellosolve, ester, or ketones, and can, therefore, form a composition for forming a colored film if it is mixed with an organic solvent and a thermosetting resin which is also soluble in an organic solvent. A colored film formed from such a composition exhibits a uniformly and excellently colored surface, even if its thickness may be sufficiently small to allow welding, i.e. may not exceed three microns.

The colored steel sheet of this invention is manufactured by a process including coating treatment which can be carried out without involving any deterioration of a solution of a film-forming composition, as opposed to any conventional etching type electrolytic treatment, or any conventional coloring treatment relying upon reaction, such as substitution plating. Moreover, the greatest advantage of the coating type of treatment is that it is applicable to any plated steel sheet, irrespective of the material used for its plating.

Reference is now made to the proportion of the dye soluble in an organic solvent to the thermosetting resin also soluble in an organic solvent of the colored film of this steel sheet and its thickness.

The colored film on the steel sheet of this invention is formed from a composition comprising 100 parts by weight of a thermosetting resin, and 1 to 200, preferably 5 to 120, parts by weight of a dye. The film has a thickness of 0.3 to 3.0, preferably 0.7 to 2.5, microns.

If the proportion of the dye is higher, and particularly, in excess of 200 parts by weight, the dye is not fully dissolved in the resin, or an organic solvent, but a part thereof settles or forms coarse particles. This is a result which is undesirable not only from an economical standpoint, but also because the undissolved dye has an adverse effect on the color of the film, and because the film is very likely to peel off any bent portion of the steel sheet.

The dye fails to produce any satisfactory coloring effect if its proportion is lower than five parts, and particularly, one part, by weight.

The film lowers the spot weldability of the steel sheet if its thickness is larger than 2.5 microns, and particularly if its thickness is larger than 3.0 microns. The film fails to show a satisfactorily high hiding power, and allows the steel surface to be seen therethrough, or produces an unevenly colored surface, if its thickness is smaller than 0.5 micron, and particularly if its thickness is smaller than 0.3 micron.

FIG. 2 is a graphical representation of the ranges of the dye proportion and the film thickness as hereinabove set forth.

The base resin which is used for the purpose of this invention is a thermosetting resin which is soluble in an organic solvent. These limitations are important for the reasons which will hereinafter be set forth. The resin need be one which is soluble in an organic solvent, since the dye which is soluble in an organic solvent is difficult to dissolve satisfacorily in a water-soluble resin. The resin need be a thermosetting one, since the use of a thermoplastic resin is likely to result in a film which is low in scratch resistance.

Specific examples of the applicable thermosetting resins which are soluble in an organic solvent are acrylic copolymer, alkyd, epoxy, polybutadiene, phenolic, polyurethane, and silicone resins, and isocyanate- or melamine-crosslinked fluororesins. It is also possible to use a mixture of two or more such resins, a product of addition condensation formed by any such resin and another monomer, or a derivative of any such resin obtained by modification with another resin. Acrylic copolymer, alkyd, and epoxy resins are, among others, preferred.

The acrylic copolymer resins are ones which can be synthesized from ordinary unsaturated ethylenic monomers by e.g. solution, emulsion or suspension polymerization. This type of resin is obtained by employing as an essential component a hard monomer such as methacrylate, acrylonitrile, styrene, acrylic acid, acrylamide or vinyltoluene, and adding an appropriate proportion of an unsaturated vinyl monomer to impart hardness, flexibility and crosslinking property to the resulting resin. The resin may be modified by another kind of resin, such as an alkyd, epoxy, or phenolic resin.

As regards the alkyd resins, it is possible to use any of the known ones which can be produced by ordinary methods for synthesis, for example, oil-modified, rosin-modified, phenol-modified, styrenated, silicone-modified, and acryl-modified alkyd resins, and oilfree alkyd (polyester) resins.

Examples of the suitable epoxy resins are straight epoxy resins of e.g. the epichlorohidrin or glycidyl ether type, and fatty acid-modified, polybasic acid-modified, acrylic resin-modified, alkyd- (or polyester-)modified, polybutadiene-modified, phenol-modified, amine- or polyamine-modified, and urethane-modified epoxy resins.

A known curing agent is used with the resin. Examples of the appropriate curing agents are melamine, block isocyanate, and urea.

The colored film formed on the steel sheet of this invention as hereinabove described possesses all of the necessary properties. The addition of certain additives as will hereinafter be described, however, makes it possible to form a film having still better properties.

Firstly, it is preferable to add a solid lubricant to a film-forming composition to form a colored film having good self-lubricating property. The following is a list of examples of the solid lubricants which are appropriate for the purpose of this invention:

(a) Hydrocarbon lubricants, such as natural and synthetic paraffins, microcrystalline wax, polyethylene wax, and chrolinated hydrocarbons;

(b) Fluororesins, such as polyfluoroethylene, polyvinyl fluoride, polytetrafluoroethylene, and polyvinylidene fluoride resins;

(c) Fatty acid amide lubricants, such as stearic acid amide, palmitic acid amide, methylenebisstearoamide, ethylenebisstearoamide, oleic acid amide, ethyl acid amide, and alkylenebis fatty acid amide;

(d) Metallic soaps, such as calcium stearate, lead stearate, calcium laurate, and calcium palmitate;

(e) Metal sulfides, such as molybdenum disulfide, and tungsten disulfide; and (f) Other lubricants, such as graphite, graphite fluoride, boron nitride, grease, and alkali metal sulfates.

It is important to select a solid lubricant which will not affect the color of the colored film. For example, a lubricant having an achromatic color, such as a hydrocarbon lubricant, or a fluororesin, is suitable for use in any film, irrespective of its color, while molybdenum disulfide having a black color is suitable for only a black film.

The solid lubricant is used in the proportion of 1 to 100 parts by weight, preferably 3 to 60 parts by weight, for 100 parts by weight of thermosetting resin. If its proportion is less than 3 parts, and particularly one part, by weight, it does not satisfactorily improve the lubricating property of the film. The use of the lubricant in any proportion in excess of 60 parts, and particularly in excess of 100 parts, by weight, is undesirable, since it lowers the strength of the film as cured, and causes it to adhere partly to a die used for pressing the steel sheet.

The colored film formed from a coating composition comprising a base resin and a dye, which are both soluble in an organic solvent, has a satisfactorily high level of corrosion resistance by virtue of the synergistic effect produced by the underlying plating layer and the chromate film. It is, however, preferable to add a rust-inhibitive pigment to the composition to form a film which exhibits a still higher level of corrosion resistance particularly when subjected to working, and thereby provides a colored steel sheet having a widened scope of application.

It is possible to use as the rust-inhibitive pigment one or more materials selected from among sparingly soluble chromates and silica. Sparingly soluble chromates are barium chromate ($BaCrO_4$), strontium chromate ($SrCrO_4$), lead chromate ($PbCrO_4$), zinc chromate ($ZnCrO_4.4Zn(OH)_2$), calcium chromate ($CaCrO_4$), potassium zinc chromate ($K_2O.4ZnO.4CrO_3.3H_2O$), and silver chromate ($AgCrO_4$).

The followings are the examples of silica used in this invention:

(1) Silica by pyrogenic process (known by commercial names such as AEROSIL 130, AEROSIL 200, AEROSIL 300, AEROSIL 380, AEROSIL R972, AEROSIL R811, AEROSIL R805, AEROSIL R974 of Nippon Aerosil Co., Ltd.);

(2) Colloidal silica (for solvent-soluble organic resin, MA-ST, IPA-ST, NBA-ST, IBA-ST, EG-ST, XBA-ST, ETC-ST, DMAC-ST, etc. by commercial names of Nissan Chemical Industries., Ltd., and for water-dispersible or water-soluble organic resin, Snawtex 20, Snawtex C, Snawtex N, Snawtex O, Snawtex S, etc. by commercial names of Nissan Chemical Industries., Ltd.);
(3) Silica by wet process precipitated type (such as T-32(S), K-41, F-80 by commercial names of TOKUYAMA SODA Co., Ltd.);
(4) Silica by wet-gel process (such as SYLOID 244, SYLOID 150, SYLOID 72, SYLOID 65, SHIELDEX by commercial names of Fuji-Davison Chemical Ltd.).

It is possible to use silica by mixing one or more kind of the above-mentioned.

It is important to select a rust-inhibitive pigment which will not have any substantial effect on the color of the colored film. Therefore, it is unsuitable to use, for example, a yellow sparingly soluble chromate in any film having a different color, such as red or blue.

One or more rust-inhibitive pigments are incorporated as one of the constituents of the film-forming composition. The rust-inhibitive pigment is used in the proportion of 1 to 100 parts, preferably 3 to 60 parts, by weight for 100 parts by weight of thermosetting resin. If its proportion is less than one part, or even three parts, by weight, it does not exhibit any rust inhibiting effect. The use of the pigment in any proportion exceeding 100 or even 60 parts by weight should be avoided, as it not only lowers the lubricating property of the film, but also produces a film surface having a lower degree of luster, or a greatly altered color.

The addition of both the solid lubricant and the granular rust-inhibitive pigment enables the formation of a colored film which is outstandingly good in both formability and corrosion resistance on any formed steel sheet portion. In this case, they are each used in the proportion of 1 to 100 parts by weight of base resin.

Moreover, another color pigment (inorganic or organic), or dye can be added to form a colored film having its color tone and luster controlled exquisitely as desired.

The addition of an inorganic or organic pigment enables the formation of a film having an improved hiding power and thereby a deeper color, or an appropriately controlled degree of luster. The addition of a solvent dye having a different color, or chemical structure enables the formation of a film having a color differing from the colors of the individual colors, as hereinbefore suggested.

The colored film as hereinabove described can be formed if the composition which has been diluted with a solvent as required is applied in an appropriate film thickness onto a steel sheet by e.g. roll squeezing or coating, or air-knife coating, and is baked by heating the sheet to a temperature of 80° C. to 300° C., preferably 120° C. to 250° C. Any ordinary method can be employed without any limitation in particular for the application and baking of the composition. It is, however, a great advantage of the steel sheet according to this invention that it can be manufactured by any coating equipment that iron and steel manufacturers usually have for producing high corrosion resistance surface treated steel sheets.

As is obvious from the foregoing, this invention provides a colored steel sheet which is weldable, since its colored film has a thickness not exceeding three microns, which is smaller than the film on any conventionally available steel sheet, and yet which as a uniformly colored and lustrous surface presenting an excellent appearance. The colored steel sheet of this invention is a product which is excellent in both various properties and productivity. In addition to its excellent appearance and weldability, it is outstandingly characterized by the high adhesive strength, formability, corrosion resistance and light fastness of its colored film. As it can be manufactured by any existing coating and baking equipment including a roll coater, its manufacture-can be accomplished by a process of greatly improved productivity which is free from any problem as has hitherto been caused by the deterioration of the coating solution by an dissolution from the plating layer on any conventional colored steel sheet made by reactive etching.

The colored steel sheet exhibits particularly high levels of corrosion resistance and light fastness if its colored film contains an azo dye composed of a complex metal salt which is soluble in an organic solvent.

EXAMPLES

The inventnion will now be described more specificially with reference to EXAMPLES 1 to 6 each directed to a steel sheet used for making an electrical appliance for domestic use, or office machine or furniture, as well as COMPARATIVE EXAMPLES 1 to 6 corresponding to EXAMPLES 1 to 6, respectively.

Each steel sheet had a surface which had been electroplated with a Zn—Ni alloy having a nickel content of 12%, or a Zn—Fe alloy having an iron content of 25%. After it had been degreased with an alkali, rinsed with water, and dried, it was coated wtih a chromate solution by a roll coater, or was electrolyzed in an electrolytic bath for chromate treatment, whereby a chromate film was formed on the plated surface of the steel sheet. After it had been dried, the film was coated with a resin solution by a roll coater. The resin film was dried, heated, and air cooled.

More specifically, the coating type of chromate treatment and the electrolytic chromate treatment were carried out, as will be described below:

Coating Type of Chromate Treatment

The chromating solution contained chromium ions having a valence of 3 and ones having a valence of 6 in the ratio of 2:3, and had a pH of 2.5 (after adjustment byKOH), and a solid content of 20 g per liter. The solution was applied by the roll coater onto the steel surface at ordinary room temperature, and dried.

Electrolytic Chromate Treatment

The bath contained 50 g of $CrO_3$ and 0.5 g of $H_2SO_4$ per liter, and had a temperature of 50° C. The film was formed by cathodic treatment using a current density of 4.9 $A/dm^2$ and an electrolyzing time of 20 seconds, followed by rinsing with water and drying.

TABLES 1 to 4 show the details of the base resins, coloring agents, solid lubricants, and granular rust-inhibitive pigments used for preparing the film compositions, as employed in the EXAMPLES of this invention and the COMPARATIVE EXAMPLES. TABLES 5a to 10b show the plated steel sheets employed, the chromate films formed thereon, the compositions used for forming colored films thereon, and the results of the tests conducted on the colored steel sheets obtained. The compositions were prepared by mixing the constituents thereof as shown in TABLES 1 to 4 in the proportions as shown in TABLES 5a to 10b, and were diluted with an organic solvent if required.

The following is a description of the tests conducted for the evaluation of each colored steel sheet:
(1) Appearance The colored film on each steel sheet was visually evaluated for its appearance, and particularly for its color uniformity. The symbols used to show the results of evaluation in the relevant tables have the following meanings, respectively:

⊚: Uniform and beauticul;

o: Substantially uniform and beautiful;

Δ–x: Rough and lacking luster, or uniformity in color.

(2) Luster

The luster of the colored film was measured at incident and reflecting angles of 60° by an instrument of Suga Test Instruments Co., Ltd. A greater value means a higher degree of luster.

(3) Weldability

Spot welding was conducted on each steel sheet and the number of continuously formed weld spots was counted as a measure of its weldability.

Spot Welding Conditions

Electrode: Cr—Cu, D type;

Electrode dia.: 6 mm;

Welding current: 10 kA;

Welding pressure: 200 kg;

Welding time: 12 cycles/60 Hz.

The symbols used to show the results have the following meanings:

⊚: 1000 or more spots;

o: 700 or more spots;

x: Less than 700 spots.

(4) Corrosion Resistance of Flat and Formed Portions

A salt spray test conforming to the requirements of JIS Z-2371 was conducted for a maximum of 480 hours on a flat portion of each steel sheet and also on a cross-cut and Erichsen-extruded portion having a height of 7 mm. The corrosion resistance of the flat portion was judged by the length of time which had passed before white rust formed in 5% by area of its surface, and the corrosion resistance of the formed portion by the length of time which had passed before white rust began to flow down along the tested portion. The symbols used to show the results have the following meanings:

⊚: No white rust occurred until the expiration of 480 hours;

+o: Occurred after 240 hours and before 480 hours;

o: Occurred after 120 hours and before 240 hours;

–o: Occurred after 72 hours and before 120 hours;

Δ: Occurred after 24 hours and before 72 hours;

x: Before 24 hours.

(5) Adhesive Strength of Colored Film

One hundred squares defining a checkered pattern and having a distance of 1 mm from one another were cut in the colored film on each steel sheet, and an adhesive tape was bonded to, and removed from, the checkered surface to see how the film would peel off the steel sheet. The symbols used to show the results have the following meanings:

⊚: No peeling occurred;

o: Peeling occurred to less than 10% by area of the film;

Δ: Peeling occurred to from 10%, inclusive, to less than 20%, by area;

x: Peeling occurred to 20% or more by area.

(6) Press Formability

Each specimen of colored steel sheet was subjected to hat-drawing, by 10 mm-extrusion through a 50 mmφ- die with a 120 mmφ blank, and an adhesive tape was bonded to, and removed from, the drawn portion of the film to determine how the film would peel off the steel sheet and adhere to the tape, and change in appearance. The symbols used to show the results have the following meanings:

⊚: No powdery peeling occurred;

+o: Some powdery peeling occurred only locally, and the film remained substantially unchanged in appearance;

o: The powdery peeling of the film colored the the tape very slightly, but the film remained substantially unchanged in appearance;

–o: The powdery peeling of the film colored the tape slightly, and the film was slightly whitened;

Δ: The powdery peeling of the film colored the tape, and the film was heavily whitened;

x: The tape was extremely colored as a result of the complete peeling of the film.

(7) Light Fastness

The colored film on each steel sheet was exposed to light applied by a fadeometer in accordance with the Second Light Exposure Method as specified by JIS L-0842, and its fade resistance was ranked in accordance with the Blue Scale, as follows:

⊚: Grade 7 or 8 of the Blue Scale;

o: Grade 5 or 6;

Δ: Grade 3 or 4;

x: Grade 1 or 2.

EXAMPLE 1 AND COMPARATIVE EXAMPLE 1

Colored steel sheets embodying this invention and having colored films formed by using different kinds of coloring agents were each evaluated for appearance, luster, weldability, formability, film adhesion, corrosion resistance and light fastness. Comparative colored steel sheets were likewise evaluated. Further information on the steel sheets and the results of their evaluation are shown in TABLES 5a and 5b. All of the colored films contained 70 parts by weight of coloring agent against 100 parts by weight of base resin, and had a thickness of 1.5 microns. It is to be noted in connection with the comparative steel sheets that, when a water-soluble dye was used as the coloring agent, a water-soluble thermosetting resin was used as the base resin for an affinity reason.

As is obvious from TABLES 5a and 5b, the steel sheets of this invention which had been prepared by using organic solvent-soluble dyes as the coloring agents exhibited the intended appearance and luster, while having colored film thickness allowing welding. On the other hand, comparative steel sheets 3 and 4, on which other dyes had been used, had an undesirably poor appearance. Comparative steel sheets 1 and 2, on which pigments had been used, were poor in appearance and luster apparently because of too small a thickness, and were also inferior in press formability, corrosion resistance and film adhesion.

Steel sheets 10 to 17 of this invention, on which azo dyes composed of complex metal salts had been used, showed a particularly high level of light fastness, and a particularly high level of corrosion resistance owing to the corrosion inhibiting action of the dyes themselves.

EXAMPLE 2 AND COMPARATIVE EXAMPLE 2

Monoazo and phthalocyanine dyes, and azo dyes composed of complex metal salts, which were all soluble in an organic solvent, were used to form colored films having different thicknesses, and analysis was made of the effects which the different film thicknesses might have on the properties of the films. Further information on the steel sheets and the results of their evaluation are shown in TABLES 6a and 6b.

Figure 3:
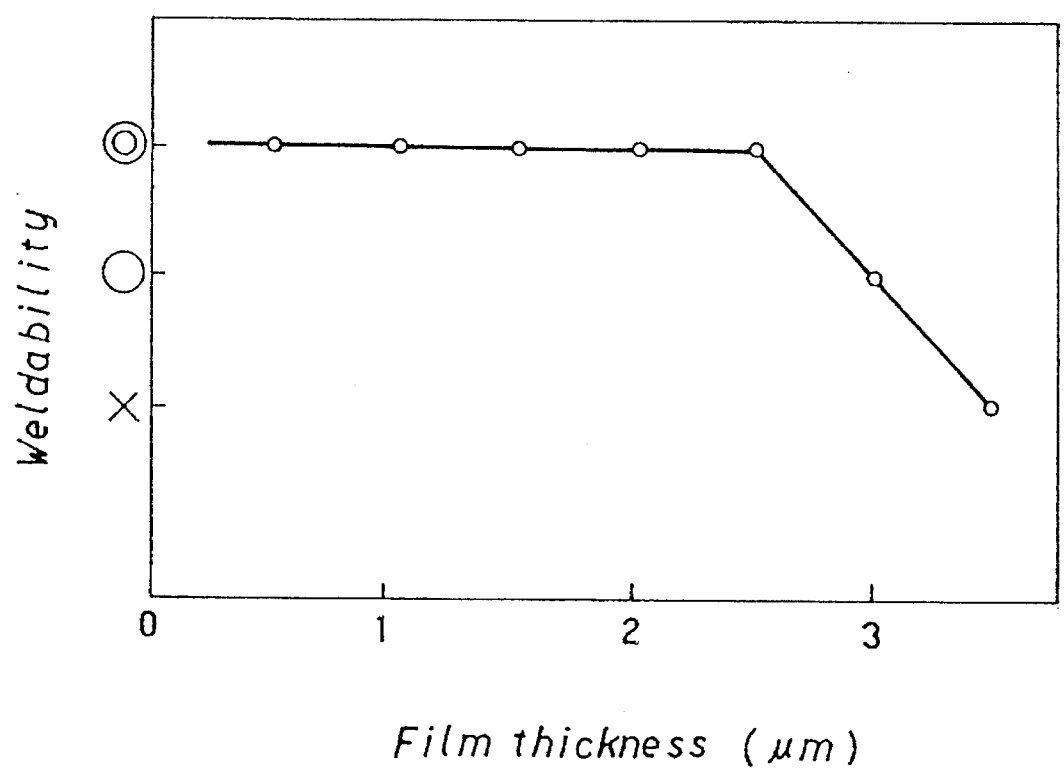
FIG. 3 is a graph showing the weldability of steel sheet samples in relation to the thickness of the colored films thereon.

FIG. 3 shows the results of weldability tests in relation to film thickness. As is obvious therefrom, the steel sheets began to lower their weldability when the colored film had a thickness in excess of 2.5 microns, and the steel sheet having a film thickness in excess of 3.0 microns could not be properly welded.

EXAMPLE 3 AND COMPARATIVE EXAMPLE 3

Monoazo and xanthene dyes, and azo dyes composed of complex metal salts, which were all soluble in an organic solvent, were used to form colored films containing different proportions of dyes, and analysis was made of the effects which the different dye proportions might have on the properties of the films. Further information on the steel sheets and the results of their evaluation are shown in TABLES 7a and 7b.

EXAMPLE 4 AND COMPARATIVE EXAMPLE 4

Monoazo and phthalocyanine dyes, azo dyes composed of complex metal salts, and a mixture of an azo dye composed of a complex metal salt and a phthalocyanine dye, which were all soluble in an organic solvent, were used to form colored films on differently plated steel surfaces, of which the majority carried a chromate film thereon. The method for chromating treatment, the coating weight of chromium, the base resin and the baking temperature were also varied, and analysis was made of the effects which the type of plating, the presence of a chromate film, the method for chromating treatment, the coating weight of chromium, the base resin and the baking temperature might have on the properties of the colored films. Further information on the steel sheets and the results of their evaluation are shown in TABLES 8a to 8d.

EXAMPLE 5 AND COMPARATIVE EXAMPLE 5

Colored films were formed on steel sheets by using monoazo, xanthene and phthalocyanine dyes, azo dyes composed of complex metal salts, and a mixture of an azo dye composed of a complex metal salt and a phthalocyanine dye, which were all soluble in an organic solvent, and also a solid lubricant and a granular rust-inhibitive pigment. They were evaluated for various properties. Analysis was made of the effects which the proportions of the solid lubricant and the granular rust-inhibitive pigment might have on the properties of the films. Further information on the steel sheets and the results of their evaluation are shown in TABLES 9a to 9d.

EXAMPLE 6 AND COMPARATIVE EXAMPLE 6

Evaluation for corrosion resistance, etc. was made of a steel sheet embodying this invention and having a colored film containing an azo dye composed of a complex metal salt, which was soluble in an organic solvent, and of a comparative steel sheet having a clear film not containing any such dye. Further information on the steel sheets and the results of their evaluation are shown in TABLES 10a and 10b. TABLES 10a and 10b show also Sample No. 5 of COMPARATIVE EXAMPLE 4 having a colored film formed on the steel surface on which no chromate film had been formed.

As is obvious from TABLES 10a and 10b, the steel sheet embodying this invention (comprising a zinc-plated steel sheet, a chromate film formed thereon and having a coating weight of 50 mg/m² and a colored film formed thereon and having a thickness of 1.5 microns) were superior in corrosion resistance to the comparative steel sheet comprimg a zinc-plated steel sheet, a chromate film formed thereon an dhaving a coating weight of 50 mg/m², and a clear film formed thereon. The superiority in corrosion resistance of the steel sheet embodying this invention is not only due to the barrier effect produced by the chromate film and the resin film, but also due to the fact that the dye itself forms a passive film, as the molecules of the dye mixed with the resin are uniformly and densely distributed in the colored film.

Moreover, it is apparent that the corrosion resistance of the steel sheet embodying this invention does not only owe itself to the colored film, but is further enhanced by the interaction of the colored film with the underlying chromate film. This is obvious from their comparison with Sample No. 5 of COMPARATIVE EXAMPE 4 having no chromate film formed thereon. This steel sheet of COMPARATIVE EXAMPLE 4 having a colored film formed directly on a zinc-plated steel surface was by far inferior in corrosion resistance to the steel sheet embodying this invention. It is evident that the outstandingly high corrosion resistance of the steel sheet embodying this invention was not only due to the barrier effect added to by the chromate film, but was due to the synergistic effect produced by the chromate film and the colored film formed thereon.

EXAMPLE 7 AND COMPARATIVE EXAMPLE 7

A chromate film having a coating weight of 50 mg/m² in terms of chromium was formed by a continuous roll coater on the degreased surface of a steel sheet plated with a Zn—Ni alloy containing 12% Ni. A composition comprising 100 parts by weight of an amine-modified epoxy resin (No. 1 in TABLE 1) and 70 parts by weight of ORASOL YELLOW 2RNL (CIBA GEIGY; TABLE 2b, No. 13) was applied onto the chromate film by the continuous roll coater, and cured by heating at 210° C. to form a colored film having a thickness of 1.5 microns, whereby a colored steel sheet embodying this invention was prepared.

For the sake of comparison, a steel sheet plated with a Zn—12%Ni alloy and having a degreased surface was dipped for five seconds in a bath for reactive blackening treatment composed of an aqueous solution of nitric acid having a concentration of 5% by weight and a temperature of 25° C., was rinsed with water, and was dried, whereby a black film was formed on the steel sheet.

The comparative steel sheet, however, began to lower its blackness when about 0.03 m² of its surface per liter of the solution had been blackened, and when about 0.04 m² of its surface had been treated, the L value as a measure of its blackness exceeded 20, and no further continuation of blackening treatment was possible. On the other hand, continuous treatment was possible for the manufacture of the steel sheet embodying this invention as long as the supply of the film-forming composition could be continued.

After the samples had been prepared, a part of the remainder of the solution which had been used for forming the colored film on the steel sheet embodying this invention was collected from the tray in the roll coater, and a part of the aqueous solution of nitric acid used for blackening the comparative steel sheet was likewise collected. The zinc content of each solution was determined by an apparatus for atomic absorption spectroscopy (Model Z-8100 of Hitachi Limited) as a measure of the amount of zinc eluted from the plating layer. Only a trace, or even a smaller amount, of zinc was detected from the solution employed for the purpose of this invention, but the solution used for the comparative purpose was found to contain zinc in the amount indicating the elution of about 5 g of Zn—12%Ni alloy per m² of the treated surface.

The salt spray test as hereinbefore described was conducted for evaluating each sample for corrosion resistance. The flat tested portion of the steel sheet embodying this invention was free of any white rust when the test lasting for 480 hours was over, but the whole surface of the comparative steel sheet was covered with white rust in about one to two hours.

A chromate film having a coating weight of 50 mg/m² in terms of chromium was formed by coating on the blackened surface of a comparative steel sheet, and a clear film having a thickness of 1.5 microns was forms/on the chromate film from the epoxy resin as hereinabove mentioned. Then, the salt spray test as hereinbefore described was conducted again on the comparative steel sheet. White rust was found on about 5% by area of the tested surface when the test lasting for 240 hours was over. Thus, it was an improvement in corrosion resistance over the steel sheet having no chromate or resin film formed on its surface. The comparative black steel sheet may also be satisfactory in corrosion resistance as a material for making an electrical appliance for domestic use, but can only be manufactured by a process comprising the steps of forming a black film by reactive blackening treatment on a steel sheet plated with a Zn—Ni alloy, rinsing with water, drying, forming a chromate film, and forming a clear resin film, while the colored steel sheet of this invention can be manufactured by a process comprising the steps of forming a chromate film on a plated steel sheet, and forming a colored film thereon. It is, therefore, another great advantage of the colored steel sheet of this invention that it can be manufactured by a simplified process not including any of the steps of reactive treatment, rinsing and drying.

The following symbols that will appear in many of the tables have the following meanings:

*1: See TABLE 1; *2: See TABLE 2a or 2b;

*3: Parts by weight of the coloring agent for 100 parts by weight of base resin;

*4: See TABLE 3;

*5: Parts by weight of solid lubricant for 100 parts by weight of base resin;

*6: See TABLE 4;

*7: Parts by weight of granular rust-inhibitive pigment for 100 parts by weight of base resin.

TABLE 1

| No. | Base Resin | Designation |
|---|---|---|
| 1 | Amine-modified epoxy resin | Resin listed as No.2 in Table 3 in Japanese Patent Appln. Laid-Open No. 8033/1989 |
| 2 | Acryl silicone resin | ZEMLAC: Product of Kanegafuchi Chemical Industrial Co., Ltd. |
| 3 | Fluororesin | LUMIFLON LF-100: Product of Asahi Glass Co., Ltd. |
| 4 | Phenoxy resin | PHENO-TOTO: Product of Toto Chemical Co., Ltd. |
| 5 | Water-soluble epoxy ester | WATERSOL S-168-D: Product of Dainippon Ink & Chemical Co., Ltd. |

(Notes)
No.1 to 3: Thermosetting resin soluble in an organic solvent
No.4: Thermoplastic resin soluble in an organic solvent
No.5: Water-soluble thermosetting resin TABLE 2a

| No. | Color | Coloring agent | C.I. Generic Name |
|---|---|---|---|
| 1 | Yellow | Organic solvent-soluble (mono)azo dye | C.I. Solvent Yellow 25 |
| 2 | Orange | Organic solvent-soluble aminoketone dye | C.I. Solvent Orange 79 |
| 3 | Red | Organic solvent-soluble xanthene dye | C.I. Solvent Red 218 |
| 4 | Violet | Organic solvent-soluble triallylmethane dye | C.I. Solvent Violet 8 |
| 5 | Blue | Organic solvent-soluble phthalocyanine dye | C.I. Solvent Blue 64 |
| 6 | Green | Organic solvent-soluble anthraquinone dye | C.I. Solvent Green 5 |
| 7 | Brown | Organic solvent-soluble (mono)azo dye | C.I. Solvent Brown 5 |
| 8 | Orange | Mixture of Nos.1 and 3 (1:1) | — |
| 9 | Yellow | Organic pigment (quinophthalone) | — |
| 10 | Red | Organic pigment (quinacridone) | — |
| 11 | Yellow | Acid mordant dye [(mono)azo dye] | C.I. Mordant Yellow 1 |
| 12 | Red | Disperse dye [(mono)azo dye] | C.I. Disperse Red 1 |

TABLE 2b

| No. | Color | Coloring agent | C.I. Generic Name | Trade Name |
|---|---|---|---|---|
| 13 | Yellow | Organic solvent-soluble azo dye composed of a complex metal salt | C.I. Solvent Yellow 89 | Orasol Yellow 2RLN (CIBA-GEIGY) |
| 14 | Orange | Organic solvent-soluble azo dye composed of a complex metal salt | C.I. Solvent Orange 56 | Zapon Orange 245 (BASF) |
| 15 | Red | Organic solvent-soluble azo dye composed of a complex metal salt | C.I. Solvent Red 83 | Aizen Spilon Red BEH (Hodogaya Chemical Co., Ltd. |

TABLE 2b-continued

| No. | Color | Coloring agent | C.I. Generic Name | Trade Name |
|---|---|---|---|---|
| 16 | Violet | Organic solvent-soluble azo dye composed of a complex metal salt | C.I. Solvent Violet 21 | Aizen Spilon Violet RH (Hodogaya Chemical Co., Ltd. |
| 17 | Brown | Organic solvent-soluble azo dye composed of a complex metal salt | C.I. Solvent Brown 43 | Orasol Brown 2RL (CIBA-GEIGY) |
| 18 | Green | Mixture of an organic solvent-soluble azo dye composed of a complex metal salt and a phthalocyanine dye | C.I. Solvent Yellow 89 C.I. Solvent Blue 57 (Mixed in a weight ratio of 1:1) | — |

TABLE 3

| No. | Solid Lubricant |
|---|---|
| 1 | Polyethylene wax (SANWAX 151-P: Sanyo Chemical Co., Ltd.) |
| 2 | Polytetrafluoroethylene powder (HOSTAFLON TF 9202: Hoechst Japan) |

TABLE 4

| No. | Granular Rust-Inhibitive Pigment |
|---|---|
| 1 | Sparingly soluble chromium compound: $BaCrO_4$ (Product of Kikuchi Color Industrial Co., Ltd.) |
| 2 | Sparingly soluble chromium compound: $CaCrO_4$ (Product of Kikuchi Color Industrial Co., Ltd.) |
| 3 | Silica: Hydrophobic ultrafine silica (Product of Nippon Aerozile Co., Ltd.; R811) |

TABLE 5a

| | Starting sheet | | Chromate film | | Colored film | | | | |
|---|---|---|---|---|---|---|---|---|---|
| | | | | Coating | | | | | |
| | | Coating | Method | weight | | | | | |
| | | weight | of | of chromium | Base resin | Additive | | Thickness | Baking temp. |
| No. | Kind of plating | [g/m²] | forming | [mg/m²] | (*1) | Kind (*2) | Proportion (parts) (*3) | [μm] | [°C.] |
| Example 1 | | | | | | | | | |
| 1 | Zinc electroplating | 20 | Coating | 50 | 1 | 1 | 70 | 1.5 | 210 |
| 2 | " | 20 | " | 50 | 1 | 2 | 70 | 1.5 | 210 |
| 3 | " | 20 | " | 50 | 1 | 3 | 70 | 1.5 | 210 |
| 4 | " | 20 | " | 50 | 1 | 4 | 70 | 1.5 | 210 |
| 5 | " | 20 | " | 50 | 1 | 5 | 70 | 1.5 | 210 |
| 6 | " | 20 | " | 50 | 1 | 6 | 70 | 1.5 | 210 |
| 7 | " | 20 | " | 50 | 1 | 7 | 70 | 1.5 | 210 |
| 8 | " | 20 | " | 50 | 1 | 8 | 70 | 1.5 | 210 |
| 9 | " | 20 | " | 50 | 1 | 13 | 70 | 1.5 | 210 |
| 10 | " | 20 | " | 50 | 1 | 14 | 70 | 1.5 | 210 |
| 11 | " | 20 | " | 50 | 1 | 15 | 70 | 1.5 | 210 |
| 12 | " | 20 | " | 50 | 1 | 16 | 70 | 1.5 | 210 |
| 13 | " | 20 | " | 50 | 1 | 17 | 70 | 1.5 | 210 |
| 14 | " | 20 | " | 50 | 1 | 18 | 70 | 1.5 | 210 |
| Comparative Example 1 | | | | | | | | | |
| 1 | Zinc electroplating | 20 | Coating | 50 | 1 | 9 | 70 | 1.5 | 210 |
| 2 | " | 20 | " | 50 | 1 | 10 | 70 | 1.5 | 210 |
| 3 | " | 20 | " | 50 | 5 | 11 | 70 | 1.5 | 210 |
| 4 | " | 20 | " | 50 | 5 | 12 | 70 | 1.5 | 210 |

TABLE 5b

| No. | Color | Appearance | Luster | Weldability | Adhesion | Press formability | Corrosion resistance Flat portion | Corrosion resistance Formed portion | Light fastness |
|---|---|---|---|---|---|---|---|---|---|
| Example 1 | | | | | | | | | |
| 1 | Yellow | ⊙ | 55 | ⊙ | ⊙ | o | ⊙ | Δ | o |
| 2 | Orange | ⊙ | 55 | ⊙ | ⊙ | o | ⊙ | Δ | o |
| 3 | Red | ⊙ | 55 | ⊙ | ⊙ | o | ⊙ | Δ | o |
| 4 | Violet | ⊙ | 55 | ⊙ | ⊙ | o | ⊙ | Δ | o |
| 5 | Blue | ⊙ | 55 | ⊙ | ⊙ | o | ⊙ | Δ | o |
| 6 | Green | ⊙ | 55 | ⊙ | ⊙ | o | ⊙ | Δ | o |
| 7 | Brown | ⊙ | 55 | ⊙ | ⊙ | o | ⊙ | Δ | o |
| 8 | Orange | ⊙ | 55 | ⊙ | ⊙ | o | ⊙ | Δ | o |
| 9 | Yellow | ⊙ | 55 | ⊙ | ⊙ | o | ⊙ | o- | ⊙ |
| 10 | Orange | ⊙ | 55 | ⊙ | ⊙ | o | ⊙ | o- | ⊙ |
| 11 | Red | ⊙ | 55 | ⊙ | ⊙ | o | ⊙ | o- | ⊙ |
| 12 | Violet | ⊙ | 55 | ⊙ | ⊙ | o | ⊙ | o- | ⊙ |
| 13 | Brown | ⊙ | 55 | ⊙ | ⊙ | o | ⊙ | o- | ⊙ |
| 14 | Green | ⊙ | 55 | ⊙ | ⊙ | o | ⊙ | o- | ⊙ |
| Comparative Example 1 | | | | | | | | | |
| 1 | Yellow | Δ | 5 | ⊙ | Δ | x | Δ | x | ⊙ |
| 2 | Red | Δ | 5 | ⊙ | Δ | x | Δ | x | ⊙ |
| 3 | Yellow | x | 55 | ⊙ | ⊙ | | | | |
| 4 | Red | x | 55 | ⊙ | ⊙ | | | | |

TABLE 6a

| No. | Starting sheet Kind of plating | Starting sheet Coating weight [g/m²] | Chromate film Method of forming | Chromate film Coating weight of chromium [mg/m²] | Colored film Base resin (*1) | Colored film Additive Kind (*2) | Colored film Additive Proportion (parts) (*3) | Colored film Thickness [μm] | Baking temp. [°C.] |
|---|---|---|---|---|---|---|---|---|---|
| Example 2 | | | | | | | | | |
| 1 | Zinc electroplating | 20 | Coating | 50 | 1 | 1 | 70 | 0.3 | 210 |
| 2 | " | 20 | " | 50 | 1 | 1 | 70 | 1.0 | 210 |
| 3 | " | 20 | " | 50 | 1 | 1 | 70 | 1.5 | 210 |
| 4 | " | 20 | " | 50 | 1 | 1 | 70 | 2.5 | 210 |
| 5 | " | 20 | " | 50 | 1 | 1 | 70 | 3.0 | 210 |
| 6 | " | 20 | " | 50 | 1 | 5 | 70 | 0.3 | 210 |
| 7 | " | 20 | " | 50 | 1 | 5 | 70 | 1.0 | 210 |
| 8 | " | 20 | " | 50 | 1 | 5 | 70 | 2.5 | 210 |
| 9 | " | 20 | " | 50 | 1 | 5 | 70 | 3.0 | 210 |
| 10 | " | 20 | " | 50 | 1 | 13 | 70 | 0.3 | 210 |
| 11 | " | 20 | " | 50 | 1 | 13 | 70 | 1.0 | 210 |
| 12 | " | 20 | " | 50 | 1 | 13 | 70 | 1.5 | 210 |
| 13 | " | 20 | " | 50 | 1 | 13 | 70 | 2.5 | 210 |
| 14 | " | 20 | " | 50 | 1 | 13 | 70 | 3.0 | 210 |
| 15 | " | 20 | " | 50 | 1 | 15 | 70 | 0.3 | 210 |
| 16 | " | 20 | " | 50 | 1 | 15 | 70 | 1.0 | 210 |
| 17 | " | 20 | " | 50 | 1 | 15 | 70 | 2.5 | 210 |
| 18 | " | 20 | " | 50 | 1 | 15 | 70 | 3.0 | 210 |
| Comparative Example 2 | | | | | | | | | |
| 1 | Zinc electroplating | 20 | Coating | 50 | 1 | 1 | 70 | 0.2 | 210 |
| 2 | " | 20 | " | 50 | 1 | 1 | 70 | 3.5 | 210 |
| 3 | " | 20 | " | 50 | 1 | 13 | 70 | 0.2 | 210 |
| 4 | " | 20 | " | 50 | 1 | 13 | 70 | 3.5 | 210 |

TABLE 6b

| No. | Color | Appearance | Luster | Weldability | Adhesion | Press formability | Corrosion resistance Flat portion | Corrosion resistance Formed portion | Light fastness |
|---|---|---|---|---|---|---|---|---|---|
| Example 2 | | | | | | | | | |
| 1 | Yellow | ○ | 35 | ◎ | ◎ | ○ | ○ | △ | ○ |
| 2 | " | ◎ | 45 | ◎ | ◎ | ○ | ◎ | △ | ○ |
| 3 | " | ◎ | 55 | ◎ | ◎ | ○ | ◎ | △ | ○ |
| 4 | " | ◎ | 65 | ◎ | ◎ | ○ | ◎ | △ | ○ |
| 5 | " | ◎ | 75 | ○ | ◎ | ○ | ◎ | △ | ○ |
| 6 | Blue | ○ | 35 | ◎ | ◎ | ○ | ○ | △ | ○ |
| 7 | " | ◎ | 45 | ◎ | ◎ | ○ | ◎ | △ | ○ |
| 8 | " | ◎ | 65 | ◎ | ◎ | ○ | ◎ | △ | ○ |
| 9 | " | ◎ | 75 | ○ | ◎ | ○ | ◎ | △ | ○ |
| 10 | Yellow | ○ | 35 | ◎ | ◎ | ○ | ○ | △ | ◎ |
| 11 | " | ◎ | 45 | ◎ | ◎ | ○ | ◎ | ○- | ◎ |
| 12 | " | ◎ | 55 | ◎ | ◎ | ○ | ◎ | ○- | ◎ |
| 13 | " | ◎ | 65 | ◎ | ◎ | ○ | ◎ | ○- | ◎ |
| 14 | " | ◎ | 75 | ○ | ◎ | ○ | ◎ | ○- | ◎ |
| 15 | Red | ○ | 35 | ◎ | ◎ | ○ | ○ | △ | ◎ |
| 16 | " | ◎ | 45 | ◎ | ◎ | ○ | ◎ | ○- | ◎ |
| 17 | " | ◎ | 65 | ◎ | ◎ | ○ | ◎ | ○- | ◎ |
| 18 | " | ◎ | 75 | ○ | ◎ | ○ | ◎ | ○- | ◎ |
| Comparative Example 2 | | | | | | | | | |
| 1 | Yellow | × | 29 | ◎ | | | | | |
| 2 | " | ◎ | 77 | × | | | | | |
| 3 | " | × | 29 | ◎ | | | | | |
| 4 | " | ◎ | 77 | × | | | | | |

TABLE 7a

| No. | Starting sheet Kind of plating | Starting sheet Coating weight [g/m²] | Chromate film Method of forming | Chromate film Coating weight of chromium [mg/m²] | Colored film Base resin (*1) | Colored film Additive Kind (*2) | Colored film Additive Proportion (parts) (*3) | Colored film Thickness [μm] | Baking temp. [°C.] |
|---|---|---|---|---|---|---|---|---|---|
| Example 3 | | | | | | | | | |
| 1 | Zinc electroplating | 20 | Coating | 50 | 1 | 1 | 1 | 1.5 | 210 |
| 2 | " | 20 | " | 50 | 1 | 1 | 5 | 1.5 | 210 |
| 3 | " | 20 | " | 50 | 1 | 1 | 20 | 1.5 | 210 |
| 4 | " | 20 | " | 50 | 1 | 1 | 70 | 1.5 | 210 |
| 5 | " | 20 | " | 50 | 1 | 1 | 120 | 1.5 | 210 |
| 6 | " | 20 | " | 50 | 1 | 1 | 200 | 1.5 | 210 |
| 7 | " | 20 | " | 50 | 1 | 3 | 1 | 1.5 | 210 |
| 8 | " | 20 | " | 50 | 1 | 3 | 5 | 1.5 | 210 |
| 9 | " | 20 | " | 50 | 1 | 3 | 120 | 1.5 | 210 |
| 10 | " | 20 | " | 50 | 1 | 3 | 200 | 1.5 | 210 |
| 11 | " | 20 | " | 50 | 1 | 13 | 1 | 1.5 | 210 |
| 12 | " | 20 | " | 50 | 1 | 13 | 5 | 1.5 | 210 |
| 13 | " | 20 | " | 50 | 1 | 13 | 20 | 1.5 | 210 |
| 14 | " | 20 | " | 50 | 1 | 13 | 70 | 1.5 | 210 |
| 15 | " | 20 | " | 50 | 1 | 13 | 120 | 1.5 | 210 |
| 16 | " | 20 | " | 50 | 1 | 13 | 200 | 1.5 | 210 |
| 17 | " | 20 | " | 50 | 1 | 17 | 1 | 1.5 | 210 |
| 18 | " | 20 | " | 50 | 1 | 17 | 5 | 1.5 | 210 |
| 19 | " | 20 | " | 50 | 1 | 17 | 120 | 1.5 | 210 |
| 20 | " | 20 | " | 50 | 1 | 17 | 200 | 1.5 | 210 |
| Comparative Example 3 | | | | | | | | | |
| 1 | Zinc electroplating | 20 | Coating | 50 | 1 | 1 | 0.1 | 1.5 | 210 |
| 2 | " | 20 | " | 50 | 1 | 1 | 250 | 1.5 | 210 |
| 3 | " | 20 | " | 50 | 1 | 13 | 0.1 | 1.5 | 210 |
| 4 | " | 20 | " | 50 | 1 | 13 | 250 | 1.5 | 210 |

TABLE 7b

| No. | Color | Appearance | Luster | Weldability | Adhesion | Press formability | Corrosion resistance Flat portion | Corrosion resistance Formed portion | Light fastness |
|---|---|---|---|---|---|---|---|---|---|
| Example 3 | | | | | | | | | |
| 1 | Yellow | ○ | 55 | ⊚ | ⊚ | ○ | ○ | △ | ○ |
| 2 | " | ⊚ | 55 | ⊚ | ⊚ | ○ | ⊚ | △ | ○ |
| 3 | " | ⊚ | 55 | ⊚ | ⊚ | ○ | ⊚ | △ | ○ |
| 4 | " | ⊚ | 55 | ⊚ | ⊚ | ○ | ⊚ | △ | ○ |
| 5 | " | ⊚ | 45 | ⊚ | ⊚ | ○ | ⊚ | △ | ○ |
| 6 | " | ○ | 30 | ⊚ | ⊚ | ○ | ⊚ | △ | ○ |
| 7 | Red | ○ | 55 | ⊚ | ⊚ | ○ | ○ | △ | ○ |
| 8 | " | ⊚ | 55 | ⊚ | ⊚ | ○ | ⊚ | △ | ○ |
| 9 | " | ⊚ | 45 | ⊚ | ⊚ | ○ | ⊚ | △ | ○ |
| 10 | " | ⊚ | 30 | ⊚ | ⊚ | ○ | ⊚ | △ | ○ |
| 11 | Yellow | ○ | 55 | ⊚ | ⊚ | ○ | ○ | △ | ⊚ |
| 12 | " | ⊚ | 55 | ⊚ | ⊚ | ○ | ⊚ | ○− | ⊚ |
| 13 | " | ⊚ | 55 | ⊚ | ⊚ | ○ | ⊚ | ○− | ⊚ |
| 14 | " | ⊚ | 55 | ⊚ | ⊚ | ○ | ⊚ | ○− | ⊚ |
| 15 | " | ⊚ | 45 | ⊚ | ⊚ | ○ | ⊚ | ○− | ⊚ |
| 16 | " | ○ | 30 | ⊚ | ⊚ | ○ | ⊚ | ○− | ⊚ |
| 17 | Brown | ○ | 55 | ⊚ | ⊚ | ○ | ○ | △ | ⊚ |
| 18 | " | ⊚ | 55 | ⊚ | ⊚ | ○ | ⊚ | ○− | ⊚ |
| 19 | " | ⊚ | 45 | ⊚ | ⊚ | ○ | ⊚ | ○− | ⊚ |
| 20 | " | ⊚ | 30 | ⊚ | ⊚ | ○ | ⊚ | ○− | ⊚ |
| Comparative Example 3 | | | | | | | | | |
| 1 | Yellow | × | 55 | ⊚ | ⊚ | | | | |
| 2 | " | × | 10 | ⊚ | × | | | | |
| 3 | " | × | 55 | ⊚ | ⊚ | | | | |
| 4 | " | × | 10 | ⊚ | × | | | | |

TABLE 8a

| | Starting sheet | | Chromate film | | Colored film | | | | |
|---|---|---|---|---|---|---|---|---|---|
| No. | Kind of plating | Coating weight [g/m²] | Method of forming | Coating weight of chromium [mg/m²] | Base resin (*1) | Additive Kind (*2) | Additive Proportion (parts) (*3) | Thickness [μm] | Baking temp. [°C.] |
| Example 4 | | | | | | | | | |
| 1 | Zinc electroplating | 20 | Coating | 1 | 1 | 1 | 70 | 1.5 | 210 |
| 2 | " | 20 | " | 10 | 1 | 1 | 70 | 1.5 | 210 |
| 3 | " | 20 | " | 150 | 1 | 1 | 70 | 1.5 | 210 |
| 4 | " | 20 | " | 200 | 1 | 1 | 70 | 1.5 | 210 |
| 5 | " | 20 | Electrolysis | 50 | 1 | 1 | 70 | 1.5 | 210 |
| 6 | " | 20 | Coating | 50 | 2 | 1 | 70 | 1.5 | 210 |
| 7 | " | 20 | " | 50 | 3 | 1 | 70 | 1.5 | 210 |
| 8 | " | 20 | " | 50 | 1 | 1 | 70 | 1.5 | 80 |
| 9 | " | 20 | " | 50 | 1 | 1 | 70 | 1.5 | 210 |
| 10 | " | 20 | " | 50 | 1 | 1 | 70 | 1.5 | 250 |
| 11 | " | 20 | " | 50 | 1 | 1 | 70 | 1.5 | 300 |
| 12 | Zn—Ni plating | 20 | " | 50 | 1 | 1 | 70 | 1.5 | 210 |
| 13 | Zn—Fe electroplating | 40 | " | 50 | 1 | 1 | 70 | 1.5 | 210 |
| 14 | Hot dip galvanizing | 90 | " | 50 | 1 | 1 | 70 | 1.5 | 210 |
| 15 | Zn—SiO₂ disperse plating | 30 | " | 50 | 1 | 1 | 70 | 1.5 | 210 |
| 17 | Zinc electroplating | 20 | Electrolysis | 50 | 1 | 5 | 70 | 1.5 | 210 |
| 18 | Zn—Ni plating | 20 | Coating | 50 | 1 | 7 | 70 | 1.5 | 210 |
| Comparative Example 4 | | | | | | | | | |
| 1 | Zinc electroplating | 20 | Coating | 500 | 1 | 1 | 70 | 1.5 | 210 |

TABLE 8a-continued

| | Starting sheet | | Chromate film | | Colored film | | | | |
|---|---|---|---|---|---|---|---|---|---|
| | | Coating | Method | Coating weight of chromium | Base | Additive | | Thickness | Baking temp. |
| No. | Kind of plating | weight [g/m²] | of forming | [mg/m²] | resin (*1) | Kind (*2) | Proportion (parts) (*3) | [μm] | [°C.] |
| 2 | " | 20 | — | — | 1 | 1 | 70 | 1.5 | 210 |
| 3 | " | 20 | " | 50 | 4 | 1 | 70 | 1.5 | 210 |

TABLE 8b

| No. | Color | Appearance | Luster | Weldability | Adhesion | Press formability | Corrosion resistance Flat portion | Corrosion resistance Formed portion | Light fastness | Remarks |
|---|---|---|---|---|---|---|---|---|---|---|
| Example 4 | | | | | | | | | | |
| 1 | Yellow | ⊙ | 55 | ⊙ | ⊙ | ○ | ○ | Δ | ○ | |
| 2 | " | ⊙ | 55 | ⊙ | ⊙ | ○ | ⊙ | Δ | ○ | |
| 3 | " | ⊙ | 55 | ⊙ | ⊙ | ○ | ⊙ | ○– | ○ | |
| 4 | " | ⊙ | 55 | ⊙ | ⊙ | ○– | ⊙ | ○ | ○ | |
| 5 | " | ⊙ | 55 | ○ | ⊙ | ○ | ⊙ | Δ | ○ | |
| 6 | " | ⊙ | 55 | ⊙ | ⊙ | ○ | ⊙ | Δ | ○ | |
| 7 | " | ⊙ | 55 | ⊙ | ⊙ | ○ | ⊙ | Δ | ○ | |
| 8 | " | ⊙ | 55 | ⊙ | ⊙ | ○ | ○ | Δ | ○ | |
| 9 | " | ⊙ | 55 | ⊙ | ⊙ | ○ | ⊙ | Δ | ○ | |
| 10 | " | ⊙ | 55 | ⊙ | ⊙ | ○ | ⊙ | Δ | ○ | |
| 11 | " | ⊙ | 55 | ⊙ | ⊙ | ○– | ○ | Δ | ○ | |
| 12 | " | ⊙ | 50 | ⊙ | ⊙ | ○ | ⊙ | ○– | ○ | |
| 13 | " | ⊙ | 50 | ⊙ | ⊙ | ○ | ⊙ | ○– | ○ | |
| 14 | " | ⊙ | 55 | ⊙ | ⊙ | ○ | ⊙ | ○– | ○ | |
| 15 | " | ⊙ | 55 | ⊙ | ⊙ | ○ | ⊙ | ○– | ○ | |
| 17 | Blue | ⊙ | 55 | ⊙ | ⊙ | ○ | ⊙ | Δ | ○ | |
| 18 | Brown | ⊙ | 50 | ⊙ | ⊙ | ○ | ⊙ | ○– | ○ | |
| Comparative Example 4 | | | | | | | | | | |
| 1 | Yellow | ⊙ | 55 | Δ–x | Δ | Δ | ⊙ | ○+ | ○ | |
| 2 | " | ⊙ | 55 | ⊙ | ○ | ⊙ | x | x | ○ | |
| 3 | " | ⊙ | 55 | ⊙ | ○ | Δ–x | ⊙ | Δ | ○ | Easily damaged |

TABLE 8c

| | Starting sheet | | Chromate film | | Colored film | | | | |
|---|---|---|---|---|---|---|---|---|---|
| | | Coating | Method | Coating weight of chromium | Base | Additive | | Thickness | Baking temp. |
| No. | Kind of plating | weight [g/m²] | of forming | [mg/m²] | resin (*1) | Kind (*2) | Proportion (parts) (*3) | [μm] | [°C.] |
| Example 4 | | | | | | | | | |
| 16 | Zinc electroplating | 20 | Coating | 1 | 1 | 13 | 70 | 1.5 | 210 |
| 17 | " | 20 | " | 10 | 1 | 13 | 70 | 1.5 | 210 |
| 18 | " | 20 | " | 150 | 1 | 13 | 70 | 1.5 | 210 |
| 19 | " | 20 | " | 200 | 1 | 13 | 70 | 1.5 | 210 |
| 20 | " | 20 | Electrolysis | 50 | 1 | 13 | 70 | 1.5 | 210 |
| 21 | " | 20 | Coating | 50 | 2 | 13 | 70 | 1.5 | 210 |
| 22 | " | 20 | " | 50 | 3 | 13 | 70 | 1.5 | 210 |
| 23 | " | 20 | " | 50 | 1 | 13 | 70 | 1.5 | 210 |
| 24 | " | 20 | " | 50 | 1 | 13 | 70 | 1.5 | 80 |
| 25 | " | 20 | " | 50 | 1 | 13 | 70 | 1.5 | 210 |
| 26 | " | 20 | " | 50 | 1 | 13 | 70 | 1.5 | 250 |

TABLE 8c-continued

| | Starting sheet | | Chromate film | | Colored film | | | | |
|---|---|---|---|---|---|---|---|---|---|
| | | Coating | Method | Coating weight of chromium [mg/m²] | Base resin (*1) | Additive | | Thickness [μm] | Baking temp. [°C.] |
| No. | Kind of plating | weight [g/m²] | of forming | | | Kind (*2) | Proportion (parts) (*3) | | |
| 27 | Zn—Ni plating | 20 | " | 50 | 1 | 13 | 70 | 1.5 | 300 |
| 28 | Zn—Fe electroplating | 40 | " | 50 | 1 | 13 | 70 | 1.5 | 210 |
| 29 | Hot dip galvanizing | 90 | " | 50 | 1 | 13 | 70 | 1.5 | 210 |
| 30 | Zn—SiO₂ disperse plating | 30 | " | 50 | 1 | 13 | 70 | 1.5 | 210 |
| 31 | Zinc electroplating | 20 | Electrolysis | 50 | 1 | 17 | 70 | 1.5 | 210 |
| 32 | Zn—Ni plating | 20 | Coating | 50 | 1 | 18 | 70 | 1.5 | 210 |
| Comparative Example 4 | | | | | | | | | |
| 4 | Zinc electroplating | 20 | Coating | 500 | 1 | 13 | 70 | 1.5 | 210 |
| 5 | " | 20 | — | — | 1 | 13 | 70 | 1.5 | 210 |
| 6 | " | 20 | " | 50 | 4 | 13 | 70 | 1.5 | 210 |

TABLE 8d

| No. | Color | Appearance | Luster | Weldability | Adhesion | Press formability | Corrosion resistance | | Light fastness | Remarks |
|---|---|---|---|---|---|---|---|---|---|---|
| | | | | | | | Flat portion | Formed portion | | |
| Example 4 | | | | | | | | | | |
| 16 | Yellow | ◉ | 55 | ◉ | ◉ | o | o | Δ | ◉ | |
| 17 | " | ◉ | 55 | ◉ | ◉ | o | ◉ | o— | ◉ | |
| 18 | " | ◉ | 55 | ◉ | ◉ | o | ◉ | o | ◉ | |
| 19 | " | ◉ | 55 | o | ◉ | o— | ◉ | o+ | ◉ | |
| 20 | " | ◉ | 55 | ◉ | ◉ | o | ◉ | o— | ◉ | |
| 21 | " | ◉ | 55 | ◉ | ◉ | o | ◉ | o— | ◉ | |
| 22 | " | ◉ | 55 | ◉ | ◉ | o | ◉ | o— | ◉ | |
| 23 | " | ◉ | 55 | ◉ | ◉ | o | o | o— | ◉ | |
| 24 | " | ◉ | 55 | ◉ | ◉ | o | ◉ | o— | ◉ | |
| 25 | " | ◉ | 55 | ◉ | ◉ | o | ◉ | o— | ◉ | |
| 26 | " | ◉ | 55 | ◉ | ◉ | o— | o | o— | ◉ | |
| 27 | " | ◉ | 50 | ◉ | ◉ | o | ◉ | o | ◉ | |
| 28 | " | ◉ | 50 | ◉ | ◉ | o | ◉ | o | ◉ | |
| 29 | " | ◉ | 55 | ◉ | ◉ | o | ◉ | o | ◉ | |
| 30 | " | ◉ | 55 | ◉ | ◉ | o | ◉ | o | ◉ | |
| 31 | Brown | ◉ | 55 | ◉ | ◉ | o | ◉ | o— | ◉ | |
| 32 | Green | ◉ | 50 | ◉ | ◉ | o | ◉ | o | ◉ | |
| Comparative Example 4 | | | | | | | | | | |
| 4 | Yellow | ◉ | 55 | Δ–x | Δ | Δ | ◉ | o+ | ◉ | |
| 5 | " | ◉ | 55 | ◉ | o | ◉ | x | x | ◉ | |
| 6 | " | ◉ | 55 | ◉ | o | Δ–x | ◉ | o— | ◉ | Easily damaged |

TABLE 9a

| | Starting sheet | | Chromate film | | Colored film | | | | | | | | |
|---|---|---|---|---|---|---|---|---|---|---|---|---|---|
| | | Coating | Method | Coating weight | Base | Additive I | | Additive II | | Additive III | | Thickness | Baking |
| No. | Kind of plating | weight [g/m²] | of forming | of chromium [mg/m²] | resin (*1) | Kind (*2) | Proportion (parts) (*3) | Kind (*4) | Proportion (parts) (*5) | Kind (*6) | Proportion (parts) (*7) | [μm] | temp. [°C.] |
| Example 5 | | | | | | | | | | | | | |
| 1 | Zinc electro- | 20 | Coating | 50 | 1 | 1 | 70 | 1 | 1 | — | — | 1.5 | 210 |

TABLE 9a-continued

| | Starting sheet | | Chromate film | | Colored film | | | | | | | | |
| | | | Coating | | | Additive I | | Additive II | | Additive III | | | |
| No. | Kind of plating | Coating weight [g/m²] | Method of forming | weight of chromium [mg/m²] | Base resin (*1) | Kind (*2) | Proportion (parts) (*3) | Kind (*4) | Proportion (parts) (*5) | Kind (*6) | Proportion (parts) (*7) | Thickness [μm] | Baking temp. [°C.] |
|---|---|---|---|---|---|---|---|---|---|---|---|---|---|
| 2 | Zinc electroplating | 20 | " | 50 | 1 | 1 | 70 | 1 | 3 | — | — | 1.5 | 210 |
| 3 | Zinc electroplating | 20 | " | 50 | 1 | 1 | 70 | 1 | 20 | — | — | 1.5 | 21 |
| 4 | Zinc electroplating | 20 | " | 50 | 1 | 1 | 100 | 1 | 60 | — | — | 2.5 | 210 |
| 5 | Zinc electroplating | 20 | " | 50 | 1 | 1 | 120 | 1 | 100 | — | — | 2.5 | 210 |
| 6 | Zn—Ni plating | 20 | " | 50 | 1 | 1 | 70 | 2 | 20 | — | — | 1.5 | 210 |
| 7 | Zinc electroplating | 20 | " | 50 | 1 | 1 | 70 | — | — | 1 | 1 | 1.5 | 210 |
| 8 | Zinc electroplating | 20 | " | 50 | 1 | 1 | 70 | — | — | 1 | 3 | 1.5 | 210 |
| 9 | Zinc electroplating | 20 | " | 50 | 1 | 1 | 70 | — | — | 1 | 20 | 1.5 | 210 |
| 10 | Zinc electroplating | 20 | " | 50 | 1 | 1 | 100 | — | — | 1 | 60 | 1.5 | 210 |
| 11 | Zinc electroplating | 20 | " | 50 | 1 | 1 | 120 | — | — | 1 | 100 | 2.5 | 210 |
| 12 | Zinc electroplating | 20 | " | 50 | 1 | 1 | 120 | — | — | 2 | 20 | 1.5 | 210 |
| 13 | Zinc electroplating | 20 | " | 50 | 1 | 1 | 120 | — | — | 3 | 20 | 1.5 | 210 |
| 14 | Zinc electroplating | 20 | " | 50 | 1 | 1 | 120 | 1 | 20 | 1 | 3 | 1.5 | 210 |
| 15 | Zinc electroplating | 20 | " | 50 | 1 | 1 | 120 | 1 | 20 | 1 | 10 | 1.5 | 210 |
| 16 | Zinc electroplating | 20 | " | 50 | 1 | 1 | 120 | 1 | 3 | 1 | 20 | 1.5 | 210 |
| 17 | Zinc electroplating | 20 | " | 50 | 1 | 1 | 150 | 1 | 60 | 1 | 60 | 1.5 | 210 |
| 18 | Zinc electroplating | 20 | " | 50 | 1 | 3 | 70 | 1 | 20 | 1 | 20 | 1.5 | 210 |
| 19 | Zinc electroplating | 20 | " | 50 | 1 | 5 | 100 | 1 | 30 | 2 | 30 | 2.0 | 210 |
| 20 Comparative Example 5 | Zn—Ni plating | 20 | " | 50 | 1 | 7 | 70 | 2 | 10 | 1 | 40 | 1.5 | 210 |
| 1 | Zinc electroplating | 20 | Coating | 50 | 1 | 1 | 70 | 1 | 150 | — | — | 1.5 | 210 |
| 2 | Zinc electroplating | 20 | " | 50 | 1 | 1 | 70 | — | — | 1 | 150 | 1.5 | 210 |

TABLE 9b

| | | | | | | Press | Corrosion resistance | | |
| No. | Color | Appearance | Luster | Weldability | Adhesion | formability | Flat portion | Formed portion | Light fastness |
|---|---|---|---|---|---|---|---|---|---|
| Example 5 | | | | | | | | | |
| 1 | Yellow | ⊙ | 55 | ⊙ | o+ | o+ | ⊙ | Δ | o |
| 2 | " | ⊙ | 53 | ⊙ | ⊙ | ⊙ | ⊙ | Δ | o |
| 3 | " | ⊙ | 45 | ⊙ | ⊙ | ⊙ | ⊙ | Δ | o |
| 4 | " | ⊙ | 35 | ⊙ | ⊙ | ⊙ | ⊙ | Δ | o |
| 5 | " | ⊙ | 30 | ⊙ | o | o | o+ | Δ | o |
| 6 | " | ⊙ | 45 | ⊙ | ⊙ | ⊙ | ⊙ | Δ | o |
| 7 | " | ⊙ | 55 | ⊙ | ⊙ | o | ⊙ | o− | o |
| 8 | " | ⊙ | 53 | ⊙ | ⊙ | o | ⊙ | o | o |
| 9 | " | ⊙ | 45 | ⊙ | ⊙ | o | ⊙ | o | o |
| 10 | " | ⊙ | 35 | ⊙ | ⊙ | o | ⊙ | o | o |
| 11 | " | ⊙ | 30 | ⊙ | o | o− | ⊙ | o | o |

TABLE 9b-continued

| No. | Color | Appearance | Luster | Weldability | Adhesion | Press formability | Corrosion resistance Flat portion | Corrosion resistance Formed portion | Light fastness |
|---|---|---|---|---|---|---|---|---|---|
| 12 | " | ⊙ | 45 | ⊙ | ⊙ | o | ⊙ | o | o |
| 13 | " | ⊙ | 45 | ⊙ | ⊙ | o | ⊙ | o | o |
| 14 | " | ⊙ | 45 | ⊙ | ⊙ | o+ | ⊙ | o | o |
| 15 | " | ⊙ | 40 | ⊙ | ⊙ | ⊙ | ⊙ | o | o |
| 16 | " | ⊙ | 45 | ⊙ | ⊙ | ⊙ | ⊙ | o | o |
| 17 | " | o | 30 | ⊙ | ⊙ | o | ⊙ | o | o |
| 18 | Orange | ⊙ | 40 | ⊙ | ⊙ | ⊙ | ⊙ | o | o |
| 19 | Blue | ⊙ | 35 | ⊙ | ⊙ | ⊙ | ⊙ | o | o |
| 20 | Brown | ⊙ | 35 | ⊙ | ⊙ | ⊙ | ⊙ | o | o |
| Comparative Example 5 | | | | | | | | | |
| 1 | Light-Yellow | Δ–x | 10 | ⊙ | Δ | Δ | ⊙ | x | o |
| 2 | Yellow | Δ–x | 10 | ⊙ | Δ | o– | ⊙ | Δ | o |

TABLE 9c

| | Starting sheet | | Chromate film | | Colored film | | | | | | | | |
|---|---|---|---|---|---|---|---|---|---|---|---|---|---|
| | | | | Coating | | Additive I | | Additive II | | Additive III | | | |
| No. | Kind of plating | Coating weight [g/m²] | Method of forming | weight of chromium [mg/m²] | Base resin (*1) | Kind (*2) | Proportion (parts) (*3) | Kind (*4) | Proportion (parts) (*5) | Kind (*6) | Proportion (parts) (*7) | Thickness [μm] | Baking temp. [°C.] |
| Example 5 | | | | | | | | | | | | | |
| 17 | Zinc electroplating | 20 | Coating | 50 | 1 | 13 | 70 | 1 | 1 | — | — | 1.5 | 210 |
| 18 | Zinc electroplating | 20 | " | 50 | 1 | 13 | 70 | 1 | 3 | — | — | 1.5 | 210 |
| 19 | Zinc electroplating | 20 | " | 50 | 1 | 13 | 70 | 1 | 20 | — | — | 1.5 | 210 |
| 20 | Zinc electroplating | 20 | " | 50 | 1 | 13 | 100 | 1 | 60 | — | — | 2.5 | 210 |
| 21 | Zinc electroplating | 20 | " | 50 | 1 | 13 | 120 | 1 | 100 | — | — | 2.5 | 210 |
| 22 | Zinc electroplating | 20 | " | 50 | 1 | 13 | 70 | 2 | 20 | — | — | 1.5 | 210 |
| 23 | Zinc electroplating | 20 | " | 50 | 1 | 13 | 70 | — | — | 1 | 1 | 1.5 | 210 |
| 24 | Zinc electroplating | 20 | " | 50 | 1 | 13 | 70 | — | — | 1 | 3 | 1.5 | 210 |
| 25 | Zinc electroplating | 20 | " | 50 | 1 | 13 | 70 | — | — | 1 | 20 | 1.5 | 210 |
| 26 | Zinc electroplating | 20 | " | 50 | 1 | 13 | 100 | — | — | 1 | 60 | 1.5 | 210 |
| 27 | Zinc electroplating | 20 | " | 50 | 1 | 13 | 120 | — | — | 1 | 100 | 2.5 | 210 |
| 28 | Zinc electroplating | 20 | " | 50 | 1 | 13 | 120 | — | — | 2 | 20 | 1.5 | 210 |
| 29 | Zinc electroplating | 20 | " | 50 | 1 | 13 | 120 | — | — | 3 | 20 | 1.5 | 210 |
| 30 | Zinc electroplating | 20 | " | 50 | 1 | 13 | 120 | 1 | 20 | 1 | 3 | 1.5 | 210 |
| 31 | Zinc electroplating | 20 | " | 50 | 1 | 13 | 120 | 1 | 20 | 1 | 10 | 1.5 | 210 |
| 32 | Zinc electroplating | 20 | " | 50 | 1 | 13 | 120 | 1 | 3 | 1 | 20 | 1.5 | 210 |
| 33 | Zinc electroplating | 20 | " | 50 | 1 | 13 | 150 | 1 | 60 | 2 | 60 | 1.5 | 210 |
| 34 | Zinc electroplating | 20 | " | 50 | 1 | 14 | 70 | 1 | 20 | 1 | 20 | 1.5 | 210 |
| 35 | Zinc electroplating | 20 | " | 50 | 1 | 17 | 160 | 1 | 30 | 2 | 30 | 2.0 | 210 |
| 36 | Zn—Ni plating | 20 | " | 50 | 1 | 18 | 70 | 2 | 10 | 1 | 40 | 1.5 | 210 |

TABLE 9c-continued

| | Starting sheet | | Chromate film | | Colored film | | | | | | | | |
|---|---|---|---|---|---|---|---|---|---|---|---|---|---|
| | | | | Coating | Base | Additive I | | Additive II | | Additive III | | Thick- | Bak- |
| No. | Kind of plating | Coating weight [g/m²] | Method of forming | weight of chromium [mg/m²] | resin (*1) | Kind (*2) | Proportion (parts) (*3) | Kind (*4) | Proportion (parts) (*5) | Kind (*6) | Proportion (parts) (*7) | ness [μm] | ing temp. [°C.] |
| Comparative Example 5 | | | | | | | | | | | | | |
| 3 | Zinc electroplating | 20 | Coating | 50 | 1 | 13 | 70 | 1 | 150 | — | — | 1.5 | 210 |
| 4 | Zinc electroplating | 20 | " | 50 | 1 | 13 | 70 | — | — | 1 | 150 | 1.5 | 210 |
| 5 | Zinc electroplating | 20 | " | 50 | 1 | 13 | 70 | 13 | 150 | 1 | 150 | 1.5 | 210 |

TABLE 9d

| No. | Color | Appearance | Luster | Weldability | Adhesion | Press formability | Corrosion resistance Flat portion | Corrosion resistance Formed portion | Light fastness |
|---|---|---|---|---|---|---|---|---|---|
| Example 5 | | | | | | | | | |
| 17 | Yellow | ⊚ | 55 | ⊚ | o+ | ⊚ | ⊚ | o− | ⊚ |
| 18 | " | ⊚ | 53 | ⊚ | ⊚ | ⊚ | ⊚ | o− | ⊚ |
| 19 | " | ⊚ | 45 | ⊚ | ⊚ | ⊚ | ⊚ | o− | ⊚ |
| 20 | " | ⊚ | 35 | ⊚ | ⊚ | ⊚ | ⊚ | o− | ⊚ |
| 21 | " | ⊚ | 30 | ⊚ | o | o | o+ | o− | ⊚ |
| 22 | " | ⊚ | 45 | ⊚ | ⊚ | ⊚ | ⊚ | o− | ⊚ |
| 23 | " | ⊚ | 55 | ⊚ | ⊚ | o | ⊚ | o | ⊚ |
| 24 | " | ⊚ | 53 | ⊚ | ⊚ | o | ⊚ | o+ | ⊚ |
| 25 | " | ⊚ | 45 | ⊚ | ⊚ | o | ⊚ | o+ | ⊚ |
| 26 | " | ⊚ | 35 | ⊚ | ⊚ | o | ⊚ | o+ | ⊚ |
| 27 | " | ⊚ | 30 | ⊚ | o | o− | ⊚ | o+ | ⊚ |
| 28 | " | ⊚ | 45 | ⊚ | ⊚ | o | ⊚ | o+ | ⊚ |
| 29 | " | ⊚ | 45 | ⊚ | ⊚ | o | ⊚ | o+ | ⊚ |
| 30 | " | ⊚ | 45 | ⊚ | ⊚ | o+ | ⊚ | o+ | ⊚ |
| 31 | " | ⊚ | 40 | ⊚ | ⊚ | ⊚ | ⊚ | o+ | ⊚ |
| 32 | " | ⊚ | 45 | ⊚ | ⊚ | ⊚ | ⊚ | o+ | ⊚ |
| 33 | " | ⊚ | 30 | ⊚ | ⊚ | ⊚ | ⊚ | o+ | ⊚ |
| 34 | Orange | ⊚ | 40 | ⊚ | ⊚ | ⊚ | ⊚ | o+ | ⊚ |
| 35 | Brown | ⊚ | 35 | ⊚ | ⊚ | ⊚ | ⊚ | o+ | ⊚ |
| 36 | Green | ⊚ | 35 | ⊚ | ⊚ | ⊚ | ⊚ | o+ | ⊚ |
| Comparative Example 5 | | | | | | | | | |
| 3 | Light-Yellow | Δ | 20 | ⊚ | Δ | Δ | ⊚ | x | ⊚ |
| 4 | Yellow | Δ | 20 | ⊚ | Δ | o− | ⊚ | Δ | ⊚ |
| 5 | Light-Yellow | Δ | 10 | ⊚ | Δ | Δ | o | Δ−x | ⊚ |

TABLE 10a

| | Starting sheet | | Chromate film | | Colored film | | | | |
|---|---|---|---|---|---|---|---|---|---|
| No. | Kind of plating | Coating weight [g/m²] | Method of forming | Coating weight of chromium [mg/m²] | Base resin (*1) | Additive Kind (*2) | Additive Proportion (parts) (*3) | Thickness [μm] | Baking temp. [°C.] |
| Example 6 | Zinc electroplating | 20 | Coating | 50 | 1 | 13 | 70 | 1.5 | 210 |

TABLE 10a-continued

| | Starting sheet | | Chromate film | | Colored film | | | | |
| | | | | Coating weight | | | | | |
| No. | Kind of plating | Coating weight [g/m²] | Method of forming | of chromium [mg/m²] | Base resin (*1) | Additive Kind (*2) | Proportion (parts) (*3) | Thickness [μm] | Baking temp. [°C.] |
|---|---|---|---|---|---|---|---|---|---|
| Comparative Example 6 | Zinc electro-plating | 20 | " | 50 | 1 | — | — | 1.5 | 210 |
| Comparative Example 4 No. 5 | Zinc electro-plating | 20 | — | — | 1 | 13 | 70 | 1.5 | 210 |

TABLE 10b

| No. | Color | Appearance | Luster | Weldability | Adhesion | Press formability | Corrosion resistance Flat portion | Corrosion resistance Formed portion | Light fastness |
|---|---|---|---|---|---|---|---|---|---|
| Example 6 | Yellow | ⊙ | 55 | ⊙ | ⊙ | ○ | ⊙ | ○– | ⊙ |
| Comparative Example 6 | " | ⊙ | 70 | ⊙ | ⊙ | ○ | ⊙ | x | — |
| Comparative Example 4 No. 5 | " | ⊙ | 55 | ⊙ | ○ | ⊙ | x | x | ⊙ |

What is claimed is:

1. A weldable colored steel sheet comprising a steel sheet having a surface plated with zinc or a zinc alloy, and carrying a chromate film formed on said plated surface and having a coating weight of 1 to 200 mg/m² in terms of metallic chromium, and a colored film formed on said chromate film from a composition comprising 100 parts by weight of a thermosetting resin as a base resin and 5 to 120 parts by weight of a dye as a coloring agent, said resin and said dye being soluble in an organic solvent, said colored film having a thickness of 0.5 to 2.5 microns, and a color other than black.

2. A weldable colored steel sheet comprising a steel sheet having a surface plated with zinc or a zinc alloy, and carrying a chromate film formed on said plated surface and having a coating weight of 1 to 200 mg/m² in terms of metallic chromium, and a colored film formed on said chromate film from a composition comprising 100 parts by weight of a thermosetting resin as a base resin, 5 to 120 parts by weight of a dye as a coloring agent and 1 to 100 parts by weight of a solid lubricant, said resin and said dye being soluble in an organic solvent, said colored film having a thickness of 0.5 to 2.5 microns, and a color other than black.

3. A weldable colored steel sheet comprising a steel sheet having a surface plated with zinc or a zinc alloy, and carrying a chromate film formed on said plated surface and having a coating weight of 1 to 200 mg/m² in terms of metallic chromium, and a colored film formed on said chromate film from a composition comprising 100 parts by weight of a thermosetting resin as a base resin, 5 to 120 parts by weight of a dye as a coloring agent and 1 to 100 parts by weight of a granular rust-inhibitive pigment, said resin and said dye being soluble in an organic solvent, said colored film having a thickness of 0.5 to 2.5 microns, and a color other than black.

4. A weldable colored steel sheet comprising a steel sheet having a surface plated with zinc or a zinc alloy, and carrying a chromate film formed on said plated surface and having a coating weight of 1 to 200 mg/m² in terms of metallic chromium, and a colored film formed on said chromate film from a composition comprising 100 parts by weight of a thermosetting resin as a base resin, 5 to 120 parts by weight of a dye as a coloring agent, 1 to 100 parts by weight of a solid lubricant and 1 to 100 parts by weight of a granular rust-inhibitive pigment, said resin and said dye being soluble in an organic solvent, said colored film having a thickness of 0.5 to 2.5 microns, and a color other than black.

5. A weldable colored steel sheet as set forth in any of claims 1 to 4, wherein said dye is at least one dye selected from the group consisting of azo, azomethine, quinoline, ketoneimine, fluorone, nitro, xanthene, acenaphthene, quinophthalone, anthraquinone, aminoketone, methine, perylene, coumarin, perinone, triphenyl, triallylmethane, phthalocyanine, isochlorophenol, and azine dyes.

6. A weldable colored steel sheet as set forth in any of claims 1 to 4, wherein said dye is a mixture of a metal complex of an azo dye, and at least one different dye selected from the group consisting of azo, azomethine, quinoline, ketoneimine, fluorone, nitro, xanthene, acenaphthene, quinophthalone, anthraquinone, aminoketone, methine, perylene, coumarin, perinone, triphenyl, triallylmethane, phthalocyanine, isochlorophenol, and azine dyes.

7. A weldable colored steel sheet as set forth in any of claims 1 to 4, wherein said dye is a metal complex of an azo dye.

8. A weldable colored steel sheet as set forth in any of claims 2 and 4, wherein said solid lubricant is at least one material selected from the group consisting of polyolefin wax and other hydrocarbon compounds, fluororesins, fatty acid amides, metallic soaps, molybdenum disulfide and other metal sulfides, graphite, graphite fluoride, boron nitride and polyalkylene glycols.

9. A weldable colored steel sheet as set forth in any of claims 3 to 4, wherein said rust-inhibitive pigment is at least one material selected from the group consisting of sparingly soluble chromium compounds and silica.

10. A weldable colored steel sheet as set forth in any of claims 2 and 4, wherein said solid lubricant is at least one material selected from the group consisting of polyolefin wax, fluororesins, fatty acid amides, metallic soaps, metal sulfides, graphite, graphite fluoride, boron nitride and polyalkylene glycols.

11. A weldable colored steel sheet as set forth in any of claims 3 and 4, wherein said rust-inhibitive pigment is at least one material selected from the group consisting of sparingly soluble chromium compounds and silica.

* * * * *